US010379247B2

(12) United States Patent
Kitazawa et al.

(10) Patent No.: US 10,379,247 B2
(45) Date of Patent: Aug. 13, 2019

(54) METHOD AND SYSTEM FOR ESTIMATING FORMATION SLOWNESS

(71) Applicant: Schlumberger Technology Corporation, Sugar Land, TX (US)

(72) Inventors: Mitsuko Kitazawa, Sagamihara (JP); Henri-Pierre Valero, Clamart (FR); Takeshi Endo, Sagamihara (JP); John Adam Donald, Abu Dhabi (AE); Erik Wielemaker, The Hague (NL)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 52 days.

(21) Appl. No.: 15/333,246

(22) Filed: Oct. 25, 2016

(65) Prior Publication Data

US 2017/0115422 A1 Apr. 27, 2017

Related U.S. Application Data

(60) Provisional application No. 62/246,553, filed on Oct. 26, 2015.

(51) Int. Cl.
*G01V 1/50* (2006.01)
*G01V 1/28* (2006.01)
*G01V 1/30* (2006.01)

(52) U.S. Cl.
CPC .......... *G01V 1/50* (2013.01); *G01V 1/282* (2013.01); *G01V 1/303* (2013.01); *G01V 1/284* (2013.01);
(Continued)

(58) Field of Classification Search
CPC .................. G01V 1/50; G01V 1/282
(Continued)

(56) References Cited

U.S. PATENT DOCUMENTS 8,831,923 B2 9/2014 Lei et al.
2006/0153005 A1\* 7/2006 Herwanger .......... E21B 41/0064
367/38

(Continued)

FOREIGN PATENT DOCUMENTS

WO 2010111077 A1 9/2010
WO 2015149237 A1 10/2015

OTHER PUBLICATIONS

Alkhalifah et al. "Velocity Analysis for Transversely Isotropic Media." Society of Exploration Geophysicists. vol. 60, No. 5, 1995 (17 pgs).

(Continued)

*Primary Examiner* — Ricky Ngon
(74) *Attorney, Agent, or Firm* — Eileen Pape

(57) ABSTRACT

A method for estimating formation slowness is provided. The method comprises forward modeling to compute formation slownesses based on a first method for orthorhombic media using stress magnitudes and third-order elastic constants as inputs, and forward modeling to determine formation slownesses analytically based on a second method using stress magnitudes, stress azimuth and third-order elastic constants as inputs. The first method may be based on Tsvankin method and the second method may be based on Christoffel method. The forward modeling may further use well configuration and reference moduli as inputs, and the results from the forward modeling may include formation slownesses, and at least one of vertical slownesses, anisotropic parameters, anellipticity indicators and fast shear azimuth. The method may further comprise assessing quality of the forward modeling based on results output from the forward modeling.

18 Claims, 18 Drawing Sheets

(52) U.S. Cl.
CPC .. *G01V 2210/614* (2013.01); *G01V 2210/622* (2013.01); *G01V 2210/626* (2013.01); *G01V 2210/66* (2013.01)

(58) Field of Classification Search
USPC .......................................................... 702/11
See application file for complete search history.

(56) References Cited

U.S. PATENT DOCUMENTS

| | | | | |
|---|---|---|---|---|
| 2007/0115755 | A1* | 5/2007 | Grechka | G01V 1/42 367/75 |
| 2008/0137478 | A1* | 6/2008 | Sollner | G01V 1/305 367/51 |

OTHER PUBLICATIONS

Bourbie et al. "Acoustics of Porous Media." Gulf Publishing Company 1987 (8 pgs).
Donald et al. "In situ calibrated velocity-to-stress transforms using shear sonic radial profiles for time-lapse production analysis." The Leading Edge, vol. 34, Issue 3, Mar. 2015. (7 pgs).
Esmersoy et al. "Fracture and stress evaluation using dipole shear anisotropy logs." 36th Annual Logging Symposium, SPWLA, Jun. 1995 (pp. 1-12).
Esmersoy et al. "Dipole Shear anisotropy logging." 64th Annual International Meeting, SEG, 1994 (pp. 1139-1142).
Herwanger et al. "Linking the reservoir geomechanics and time-lapse seismics: Predicting anisotropic velocity changes and seismic attributes." Geophysics. vol. 74, No. 4, 2009. (21 pages).
Jocker et al. "TI Anisotropic Model Building Using Borehole Sonic Logs Acquired in Heterogeneous Formations." Society of Exploration Geophysicists 2013. (5 pages).
Piste et al. "Determining stress regime and Q factor from sonic data." Society of Petrophysicists and Well-Log Analysts, 2009. (11 pages).
B. Sinha "Near-wellbore characterization using radial profiles of the shear slownesses." Society of Exploration Geophysicists, 2004. (4 pages).
Ilya Tsvankin "Anisotropic parameters and P-wave velocity for othorhombic media." Geophysics, vol. 62, No. 4. 1997. (18 pages).
Ilya Tsvankin "Seismic signature and analysis of Reflection data in Anisotropic media." Seismic Exploration, vol. 29, 2001. (7 pgs).
Fjaer et al., "Petroleum Related Rock Mechanics." 2nd Edition Developments in Petroleum Science 53, 2008. (12 pgs).
Kimball et al. "Error Analysis of Maximum Likelihood Estimates of Physical Parameters from One or More Dispersive Waves." IEEE Transactions on Signal Processing, vol. 43, No. 12, Dec. 1995. (9 pgs).
Lei et al.,"Estimation of Horizontal Stress Magnitudes and Stress Coefficients of Velocities Using Borehole Sonic Data." Geophysics, vol. 77, No. 3 (2012) (16 pgs).
Mavko et al., "Tools for Seismic Analysis of Porous Media." The Rock Physics Handbook, Second Edition. Oct. 2016. (12 pgs).
Musgrave., "Crystal Acoustics: Introduction to The Study of Elastic Waves and Vibrations in Crystals." Holden-Day 1970. (10 pgs).
Prioul et al., "Nonlinear Rock Physics Model for Estimation of 3D Subsurface Stress in Anisotropic Formations: Theory and Laboratory Verification." Geophysics, vol. 69, No. 2, 2004. (pp. 415-425).
Sun et al., "Relating Sher Sonic Anisotropy Directions to Stress in Deviated Wells." Geophysics, vol. 75, No. 5, 2010. (11 pgs).
Thurston et al., "Third-Order Elastic Constants and the Velocity of Small Amplitude Elastic Waves in Homogeneously Stressed Media." Physical Review, vol. 133, No. 6A, Mar. 1964 (7 pgs).

* cited by examiner

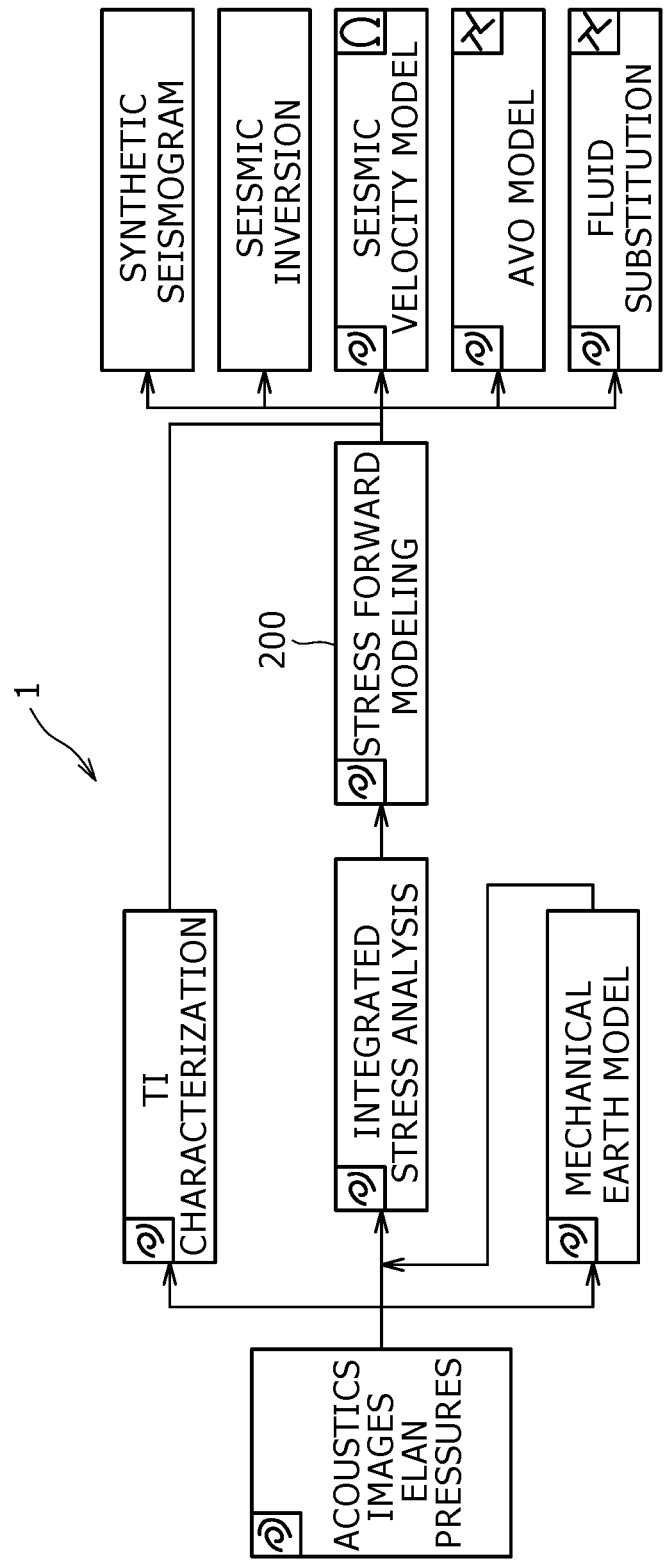
F I G. 1

METHOD AND SYSTEM FOR ESTIMATING FORMATION SLOWNESS

CROSS-REFERENCE TO RELATED APPLICATIONS

This application is based upon and claims the benefit of the priority of U.S. Provisional Application Ser. No. 62/246,553 entitled "METHOD TO ESTIMATE FORMATION SLOWNESS" filed on Oct. 26, 2015, the disclosure of which is incorporated herein in its entirety by reference thereto.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art. The following descriptions and examples are not admitted to be prior art by virtue of their inclusion in this section.

The present disclosure relates generally to methods and systems for estimating formation slowness. In particular, the present disclosure relates to methods and systems for estimating formation slowness in presence of anisotropy and/or stress in downstream geophysics workflow utilizing sonic measurements.

The downstream geophysics workflow utilizing sonic measurements includes, for example, rock physics modeling, seismic inversion, well ties, Amplitude-Versus-Offset (AVO) modeling and so on, as disclosed in the documents of International Publication No. WO 2010/11077 A1, U.S. Pat. Application Publication No. 2011/0077920 A1, U.S. Pat. Application Publication No. 2006/0153005 A1 and International Publication No. WO 2005/149237 A1, the contents of which are incorporated herein in its entirety by reference thereto. The data of sonic measurements can be received from an acoustic tool and included directly into their geophysical modeling software packages for a quantitative interpretation. However in a number of cases, anisotropy effects, which are either TI (Transverse Isotropy) in shales or stress in sands, are not included in this modeling software. For example, a TI characterization workflow is developed by Jocker et al. (2013), as described in the document of J. Jocker, E. Wielemaker and S. Sunaga, (2013), "TI Anisotropic Model Building Using Borehole Sonic Logs Acquired in Heterogeneous Formations", SEG Technical Program Expanded Abstracts, pp. 305-309 (2013). The TI Characterization workflow addresses the shales case, yet there are still challenges within the reservoir (e.g. sands) where the slownesses are responding to stress and anisotropy. The challenge is further complicated in deviated wells where verticalized slownesses are mandatory for getting accurate outcomes from seismic workflows.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the present disclosures, a method for estimating formation slowness comprises forward modeling to compute formation slownesses based on a first method for orthorhombic media using stress magnitudes and third-order elastic constants as inputs, and forward modeling to determine formation slownesses analytically based on a second method using stress magnitudes, stress azimuth and third-order elastic constants as inputs.

In another aspect of the present disclosures, a system for estimating formation slowness comprises a memory and a processor. The processor is used to perform forward modeling to compute formation slownesses based on a first method for orthorhombic media using stress magnitudes and third-order elastic constants as inputs; and perform forward modeling to determine formation slownesses analytically based on a second method using stress magnitudes, stress azimuth and third-order elastic constants as inputs.

In some embodiments of the disclosures herein, the first method may be based on Tsvankin method assuming a weak anisotropy, and the second method may be based on Christoffel method. The forward modeling may further use well configuration and reference moduli as inputs, and the results from the forward modeling may include formation slownesses, and at least one of vertical slownesses, anisotropic parameters, anellipticity indicators and fast shear azimuth.

The method disclosed herein may further comprise assessing quality of the forward modeling based on results output from the forward modeling. The assessing may comprises at least one of comparing formation slowness between the output results from the forward modeling and measurements, evaluating type of anisotropy using anellipticity parameters, and comparing fast shear azimuth between the output results from the forward modeling and measurements. Herein, the comparing formation slowness may comprise computing at least one of normalized difference and coherence between measured and modeled slowness. In some embodiments of the disclosure, the method may further comprise combining the forward modeling to TI (Transverse Isotropy) characterization workflow, and may further comprise outputting results of the forward modeling to other domains including seismics and geomechanics.

In the system disclosed herein, the processor may me used further to assess quality of the forward modeling based on results output from the forward modeling. The assessment comprises at least one of a comparison of formation slowness between the output results from the forward modeling and measurements, an evaluation of type of anisotropy using anellipticity parameters, and a comparison of fast shear azimuth between the output results from the forward modeling and measurements. Herein, the comparison of formation slowness may comprise computation of at least one of normalized difference and coherence between measured and modeled slowness. In some embodiments of the disclosure, the processor may be used further to combine the forward modeling to TI (Transverse Isotropy) characterization workflow, and may be used further to output results of the forward modeling to other domains including seismics and geomechanics.

Advantages and novel features of the disclosures will be set forth in the description which follows or may be learned by those skilled in the art through reading the materials herein. Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. Embodiments of an acoustic transducer and a downhole tool including the same according to the disclosures herein are described with reference to the following figures. The same numbers are used throughout the figures to reference like features and components. The drawings are as follows:

FIG. 1 illustrates one example of general workflow including a stress forward modeling according to embodiments of the disclosure;

DETAILED DESCRIPTION

Figure 2:
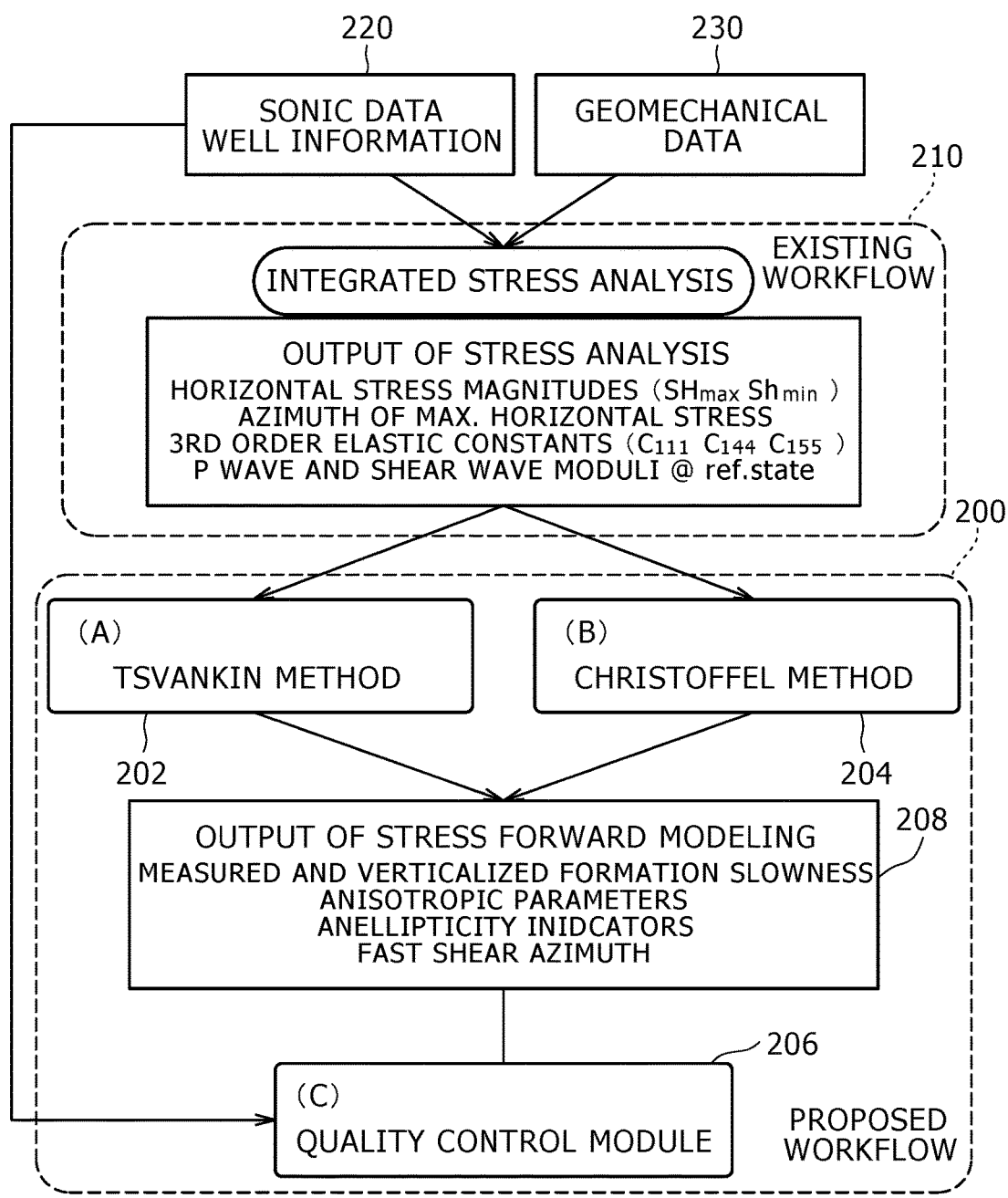
FIG. 2 illustrates one example of detailed workflow including the forward modeling according to an embodiment of the disclosure.

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising".

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

The various techniques disclosed herein may be utilized to facilitate and improve data acquisition and analysis in downhole tools and systems. In this, downhole tools and systems are provided that utilize arrays of sensing devices that are configured or designed for easy attachment and detachment in downhole sensor tools or modules that are deployed for purposes of sensing data relating to environmental and tool parameters downhole, within a borehole. The tools and sensing systems disclosed herein may effectively sense and store characteristics relating to components of downhole tools as well as formation parameters at elevated temperatures and pressures The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Referring to FIG. 1, a workflow 1 including stress forward modeling 200 of the disclosure may aim to link the stress analysis and downstream modules, and to determine an anisotropic slowness model allowing a determination of slownesses for a given well and stress orientation and magnitudes. The forward modeling (module) 200 provides the verticalized and estimated slowness, as well as the anisotropic parameters that are needed for seismic workflows. Thus, for deviated wells, this allows to verticalize slowness estimation, providing thus required inputs for downstream workflows 1 in FIG. 1. It is noted that the verticalized slownesses are required as inputs for synthetic seismograms and AVO (Amplitude-Versus-Offset)/AVAZ (Amplitude-Versus-Azimuth) modeling.

Stress field and formation velocities/properties are closely linked, as a result, it is possible to assess the effects of stress field on sonic measurements. In addition, the knowledge of the stress effects may be used to predict anisotropic velocity changes and time-lapse monitoring, as described in the documents of Donald, J. A. and Prioul, R., "In situ calibrated velocity-to-stress transforms using shear sonic radial profiles for time-lapse production analysis", The Leading Edge, Vol. 34, Issue 3 (March 2015), and Herwanger J. V. and Home S. A., "Linking reservoir geomechanics and time-lapse seismics: Predicting anisotropic velocity changes and seismic attributes", Geophysics, Vol. 74, No. 4, pp. W13-W33 (2009), the contents of which are incorporated herein in its entirety by reference thereto.

Overview

A method according to an embodiment of the disclosure estimates formation slowness for an anisotropic formation under stress. The method 200 comprises the following three parts (A)-(C) as shown in FIG. 2:
- (A) Forward modeling based on Tsvankin method 202 described in the document of Tsvankin, I., "Anisotropic parameters and P-wave velocity for othorhombic media", Geophysics, Vol. 62, No. 4, pp. 1292-1309 (July-August 1997), the content of which is incorporated herein in its entirety by reference thereto. The formation slownesses are computed using the extended Tsvankin's method developed for orthorhombic media. Slownesses are expressed in function of the formation anisotropic parameters.
- (B) Forward modeling based on the resolution of Christoffel equations in Christoffel method 204. The formation slownesses are determined analytically for a given set of inputs.
- (C) Quality control (QC) module 206 to control results 208 from the stress forward modeling 210, 220. The QC module 206 may assess quality of output results 208 from the two types of forward modeling based on Tsvankin method 202 and the Christoffel method 204.

For both Tsvankin and Christoffel approaches 202, 204, the inputs 210 required are as follows:
Maximal and minimal horizontal stress magnitudes, (i.e. SHmax, Shmin) and vertical stress magnitude (i.e. SV), Azimuth of the maximal horizontal stress (SHmax_Az), Third-order elastic constants ($C_{111}$, $C_{144}$ and $C_{155}$), and P-wave and shear moduli at reference state corresponding to the part of the formation which is unperturbed. In practice such slownesses are estimated using radial profiling techniques described in the document of Lei, T., Sinha, B. K. and Sanders, M., "Estimation of horizontal stress magnitudes and stress coefficients of velocities using borehole sonic data", Geophysics, Vol. 77, No. 3, pp. WA181-WA196 (2012), the contents of which are incorporated herein in its entirety by reference thereto.

These inputs may be output from an integrated stress analysis 210 using sonic measurement data and wellbore information 220 and geomechanical data 230.

Each of the methods 202 and 204 may provide an estimate of the verticalized slownesses and may compute anisotropic parameters and anellipticity indicators described in the documents of Alkhalifah, T. and Tsvankin, I., "Velocity analysis for transversely isotropic media. Geophysics, Vol. 60, No. 5, pp. 1550-1566 (September-October 1995), the foregoing Tsvankin (1997); and Sun, H. and Prioul, R., "Relating shear sonic anisotropy directions to stress in deviated wells", Geophysics, Vol. 75, No. 5, pp. D57-D67 (2010), the contents of which are incorporated herein in its entirety by reference thereto.

Details of computation for both methods are explained in next sections.

Figure 3:
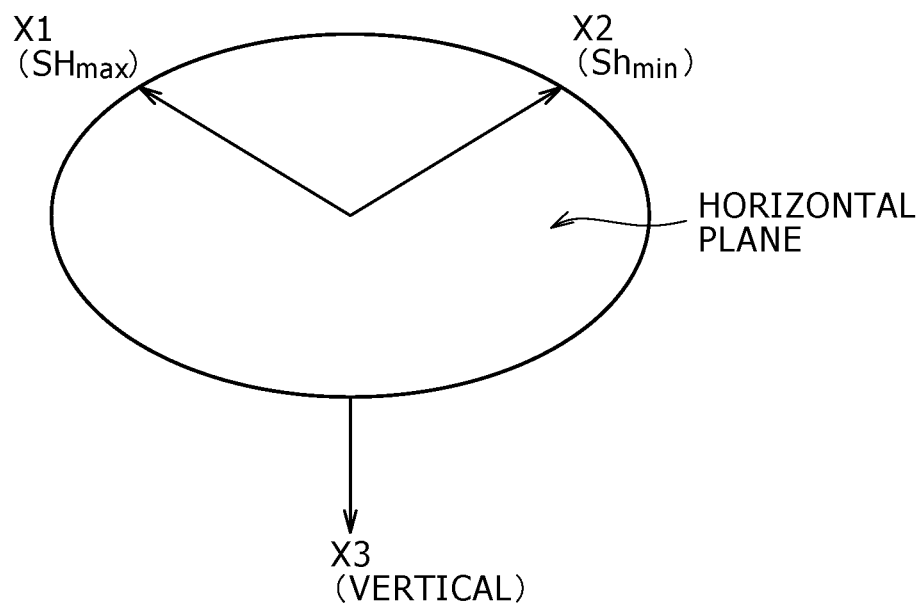
FIG. 3 illustrates an earth-stress frame used in the forward modeling according to an embodiment of the disclosure.
Figure 4:
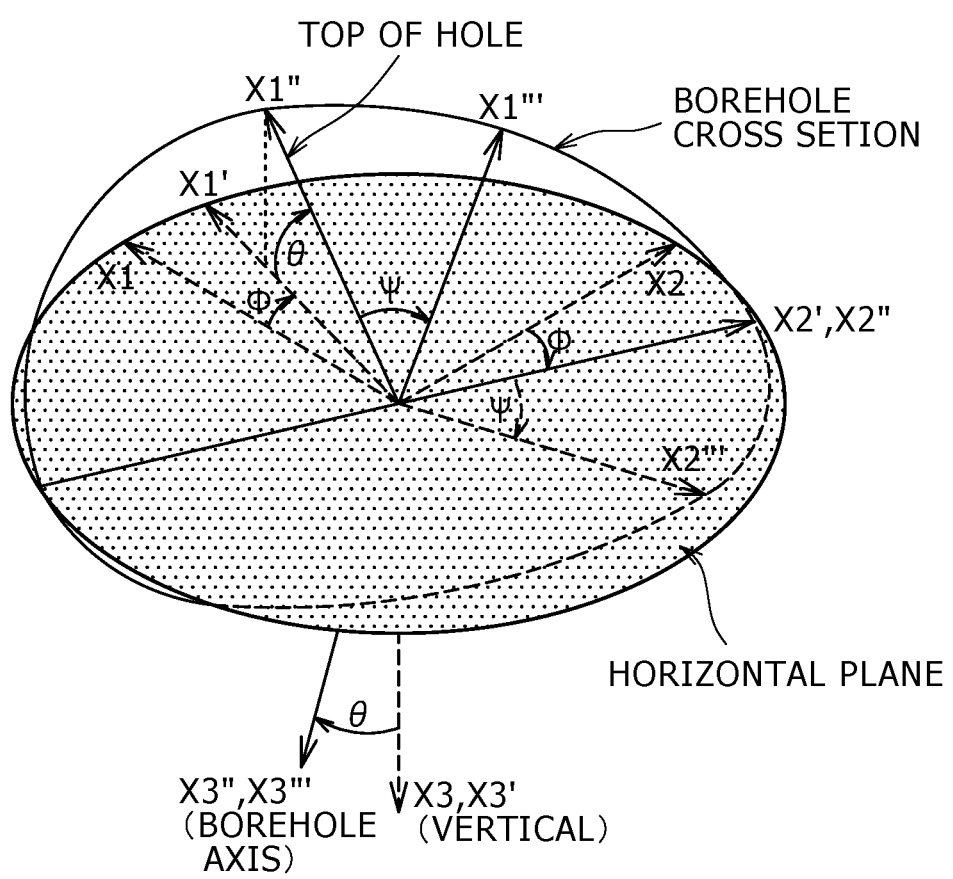
FIG. 4 illustrates an angle configuration for Top-Of-Hole (TOH) frame used in the forward modeling according to an embodiment of the disclosure.

Angle, Rotation and Reference Frame a. Earth-Stress Frame:

The angles considered in this workflow are oriented in the earth-stress frame defined by $x_1$, $x_2$ and $x_3$ as shown in FIG. 3. The vector $x_1$ is pointing to the azimuth of the maximum horizontal stress (SHmax) and the vector $x_2$ is pointing to the azimuth of the minimum horizontal stress (Shmin) on a horizontal plane, and the vector $x_3$ is pointing vertically downward.

b. Rotation:

The borehole orientation is defined by the hole deviation $\theta$ and azimuth $\varphi$ as shown in FIG. 4.

The rotation matrix around $\theta$ and $\varphi$ are given by:

$$Rot_{dev} = \begin{pmatrix} \cos\theta & 0 & -\sin\theta \\ 0 & 1 & 0 \\ \sin\theta & 0 & \cos\theta \end{pmatrix} \quad (1)$$

and $$Rot_{azi} = \begin{pmatrix} \cos\varphi & \sin\varphi & 0 \\ -\sin\varphi & \cos\varphi & 0 \\ 0 & 0 & 1 \end{pmatrix}. \quad (2)$$

The rotation matrix around $\psi$ is given by:

$$Rot_{RB} = \begin{pmatrix} \cos\psi & \sin\psi & 0 \\ -\sin\psi & \cos\psi & 0 \\ 0 & 0 & 1 \end{pmatrix}. \quad (3)$$

The relative bearing $\psi$ is the plane angle in the cross-section with respect to the top of the hole.

c. Change of Reference Frame:

In the proposed workflow, the stress tensor is expressed directly with the horizontal and vertical stress magnitudes, SHmax, Shmin and SV respectively. The reference frame in which the slowness is estimated depends on the reference frame in which the stress magnitudes are expressed. If the stresses are in North-East-Vertical (NEV) frame, then the estimated slowness are in North-East-Vertical frame. Similarly, if the stresses are in Top-Of-Hole (TOH) frame, slownesses are in Top-Of-Hole frame. Both frames are linked, and it is possible to convert North-East-Vertical frame to Top-Of-Hole frame (resp. Top-Of-Hole frame to North-East-Vertical frame), by applying the rotation matrix rot of the following Equation (4), as described in the document of Fjaer, E., Holt, R., Horsrud, P., Raaen, A. and Risnes, R., "Petroleum related rock mechanics", Elsevier (2004), the content of which is incorporated herein in its entirety by reference thereto.

$$\sigma_{TOH} = rot\ \sigma_{NEV} rot^T \quad (4)$$

with $\sigma_{TOH}$: stress tensor in Top-Of-Hole (TOH),
$\sigma_{NEV}$: stress tensor in North-East-Vertical (NEV), and
rot=rotation matrix=$rot_{dev} rot_{azi} rot_{RB}$.

Table 1 summarizes cases requiring frame conversion. The choice of the reference depends on the purpose of the forward model results. If the stress forward modeling is a part of the large scale multi-disciplinary workflow, linking sonic, geomechanics and seismics for example, it is more advantageous to work in North-East-Vertical frame. On contrarily, if the modeling is a part of a workflow focused on the near-borehole study, then users might prefer working in Top-Of-Hole frame, especially if the fast shear azimuth (FSA) is involved in the work. The reference frame can be transformed by applying the rotation matrix (Equation (4)).

TABLE 1

Summary of the reference frame convention.

| Reference frame of stress tensor | Reference frame of stress forward modeling | Frame conversion |
| --- | --- | --- |
| North-East-Vertical | North-East-Vertical | N/A |
| Top-Of-Hole | Top-Of-Hole | N/A |
| North-East-Vertical | Top-Of-Hole | Equation (4) |
| Top-Of-Hole | North-East-Vertical | |

It is noted that if the input are provided by Integrated Stress Analysis method (Lei et al., 2012), the stress magnitudes are expressed in the North-East-Vertical frame. Therefore, outputs of the forward modeling are in North-East-Vertical frame.

Workflow Input

The proposed workflow according to embodiments of the disclosure estimates the slownesses for an anisotropic formation under stress. The stresses and elastic constants are required as inputs in Table 2 for both of Tsvankin and Christoffel methods. In Tsvankin method does not need the azimuth data, i.e. hole and maximal horizontal stress azimuths. Other inputs are same for both methods. The Tsvankin method does not require the azimuths (i.e. hole azimuth and azimuth of maximal stress magnitude) as indicated with cross in Table 2.

TABLE 2

List of required input for Christoffel and Tsvankin methods to estimate formation slownesses.

| | Method | | | |
| --- | --- | --- | --- | --- |
| Variable name | Christoffel | Tsvankin | Origin of inputs | Unit |
| Bulk density | ✓ | ✓ | Gamma ray | g/cm³ |
| Hole deviation | ✓ | ✓ | Gyro | deg |
| Hole azimuth | ✓ | x | Gyro | deg |
| Reference shear modulus | ✓ | ✓ | Acoustic (radial profile) | GPa |
| Reference P-wave modulus | ✓ | ✓ | Acoustic (radial profile) | GPa |
| Max. horizontal stress | ✓ | ✓ | Mud and pore pressures | GPa |
| Min. horizontal stress | ✓ | ✓ | Mud and pore pressures | GPa |
| Vertical stress | ✓ | ✓ | Mud and pore pressures | GPa |

TABLE 2-continued

List of required input for Christoffel and Tsvankin methods to estimate formation slownesses.

| | Method | | | |
| --- | --- | --- | --- | --- |
| Variable name | Christoffel | Tsvankin | Origin of inputs | Unit |
| Azimuth of max. horizontal stress | ✓ | x | Mud and pore pressures | deg |
| $C_{111}$ | ✓ | ✓ | Mud and pore pressures | GPa |
| $C_{144}$ | ✓ | ✓ | Mud and pore pressures | GPa |
| $C_{155}$ | ✓ | ✓ | Mud and pore pressures | GPa |

Assumptions

In this section, the various assumptions linked with embodiments of the workflow are presented.

a. General Assumptions:

The proposed method to estimate the formation slowness is applied to anisotropic formation under stress. The formation at reference state is assumed to be in a hydrostatically stressed isotropic state (Lei et al, 2012). In addition, the formation slownesses is assumed to be affected by the stresses and the formation anisotropy (Lei et al., 2012).

b. Tsvankin Method:

For this method, assumptions are as follows:

Formation is orthorhombic (i.e. anisotropic),

Velocities (i.e slownesses) are expressed in function of the vertical velocities and the anisotropic parameters (i.e. Thomsen parameters), and The formation anisotropy is weak for this case. However, this method can also be applied to cases of strong anisotropy.

c. Christoffel Method:

In this method, assumptions are as follows:

Acoustic wave is harmonic plane wave,

Propagation along a principal direction (direction given by the velocity vector), Velocities are phase velocities, and No weak anisotropy assumption.

Slowness Estimation Using Tsvankin's Method

Figure 5:
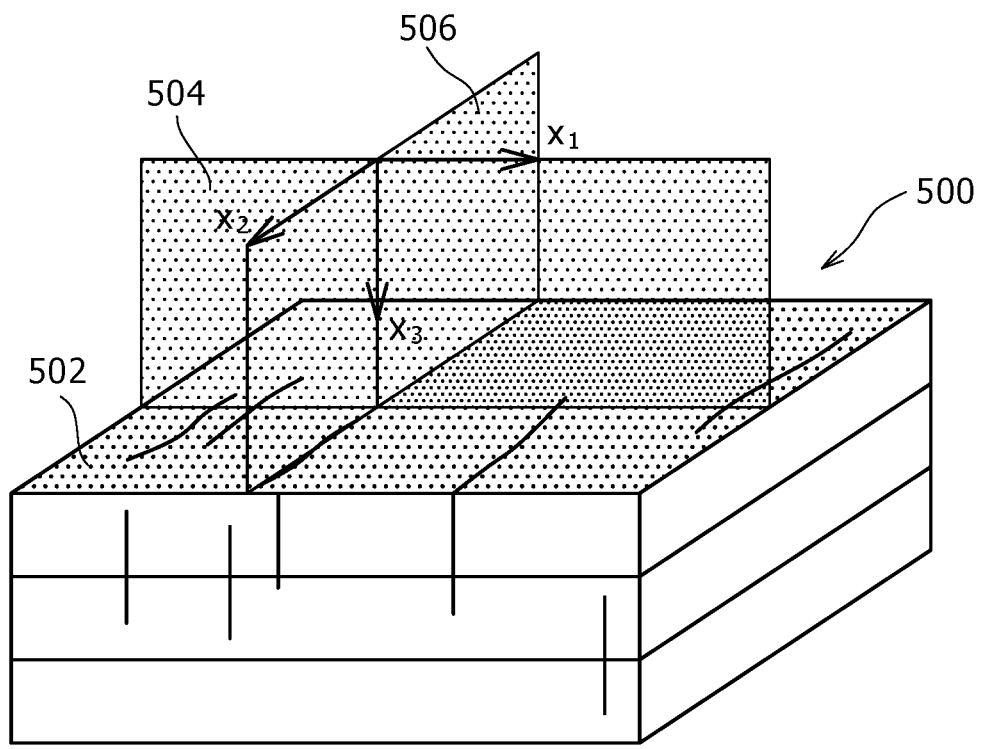
FIG. 5 illustrates a symmetry plane for orthorhombic media used in the forward modeling according to an embodiment of the disclosure.

The formation slowness (compressional, fast and shear slowness) is computed from the minimum stress (Shmin) and maximum stress (SHmax) magnitudes, using the method developed by Tsvankin (1997) for orthorhombic media 500 as shown in FIG. 5. The formation slownesses, compressional, shear vertical (SV) and shear horizontal (SH) are expressed as function of the well deviation θ and the anisotropic parameters. Orthorhombic media 500 has three symmetry planes 502 ($[x_1, x_2]$), 504 ($[x_1, x_3]$) and 506 ($[x_2, x_3]$) in FIG. 5 The Tsvankin method takes advantage of the symmetry properties and decomposes the orthorhombic system into transverse isotropic (TI) in each symmetry plane 502, 504, 506 (Tsvankin, 1997). Anisotropic parameters (i.e. Thomsen parameters) are defined for each symmetry plane 502, 504, 506. By definition, parameters in $[x_2-x_3]$ are along x1 direction and are marked with subscript (1) i.e. $\varepsilon^{(1)}$, $\delta^{(1)}$ and $\gamma^{(1)}$. Similarly, parameters in $[x_1-x_3]$ are along x2 and are marked with (2). This method assumes a weak anisotropic formation.

The required inputs in the foregoing Table 2 are as follows:
- Maximum and minimum stress magnitude (SHmax, Shmin),
- Third order elastic constants ($C_{111}$, $C_{144}$ and $C_{155}$),
- Pwave ($M_{ref}$) modulus at reference state, i.e. in hydrostatically stressed isotropic state (Lei et al, 2012),
- Shear modulus ($\mu_{ref}$) at reference state, and
- Well trajectory (deviation, inclination).

The reference frame of the results from the stress forward modeling depends on the frame in which the stresses are expressed (cf. Table 1). If the stress tensor is in North-East-Vertical frame, then results from modeling are in North-East-Vertical frame.

Outputs from the Tsvankin's method are as follows:
Estimation of formation velocities (i.e. slowness=1/velocity):
- Compressional velocity Vp,
- Fast shear velocity Vsh,
- Slow shear velocity Vsv Estimation of the vertical velocities (The vertical velocity corresponds to the velocity projected on the true vertical axis):
- Vertical compressional velocity $Vp_0$,
- Vertical fast shear velocity $Vs_0$,
- Vertical slow shear velocity $Vs_1$, Anisotropic parameters, corresponding to the Thomsen parameters in given symmetry plane:
- along x1 (i.e. in [$x_2$-$x_3$] plane): $\varepsilon^{(1)}$, $\delta^{(1)}$ and $\gamma^{(1)}$
- along x2 (i.e. in [$x_1$-$x_3$] plane): $\varepsilon^{(2)}$, $\delta^{(2)}$ and $\gamma^{(2)}$ anisotropic indicators also named "anellipticity":
- η for compressional wave (Alkhalifah et al, 1995)
- H for shear vertical (i.e. slow shear) wave (Sun et al, 2010)

Figure 6:
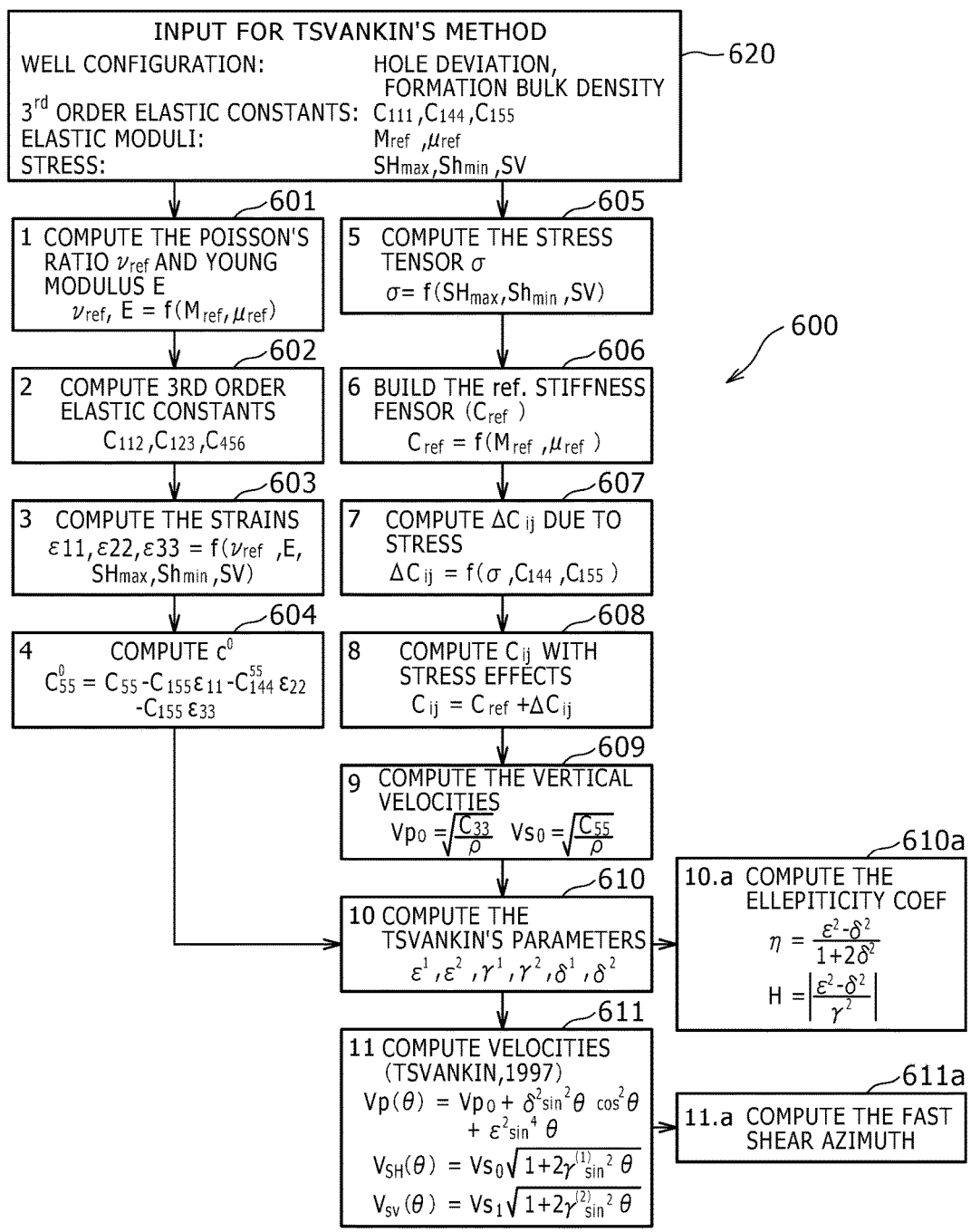
FIG. 6 is a flowchart showing details of the forward modeling using the Tsvankin method according to an embodiment of the disclosure.

Referring to FIG. 6, the computation workflow 600 of forward modeling based on the Tsvankin method using the inputs 620 is described step by step.

1. Computation of the Poisson's Ratio and Young Modulus (Step 601):

The P-wave modulus, $M_{ref}$, and the shear modulus, $\mu_{ref}$, at reference state i.e. in hydrostatically stressed isotropic state (Lei et al, 2012) are required inputs for the proposed workflow 600 of forward modeling using the Tsvankin method in FIG. 6. These moduli may be determined using the stress analysis method developed by Lei et al (2012), based on the radial profiling techniques. In additional to the P-wave and shear moduli, the Young's modulus (E) and Poisson's ratio ($v_{ref}$) nay be necessary to build the elastic stiffness tensor as described in the document of Mavko Gary, Mukerji, T. and Dvorkin, J., "The Rock physics handbook", Cambridge University Press (2009), the content of which is incorporated herein in its entirety by reference thereto.

The relationships between these four moduli are given by the following Equations (5)-(7). The P wave modulus $M_{ref}$ is given by:

$$M_{ref} = 2\mu_{ref} \frac{1 - v_{ref}}{1 - 2v_{ref}}. \quad (5)$$

From the Equation (5), the Poisson's ratio is computed as:

$$v_{ref} = \frac{M_{ref} - 2\mu_{ref}}{2M_{ref} - 2\mu_{ref}}. \quad (6)$$

The young modulus E is given by:

$$E = \frac{\mu_{ref}(3M_{ref} - 4\mu_{ref})}{M_{ref} - \mu_{ref}}. \quad (7)$$

2. Computation of Third Order Elastic Constants (Step 602):

In order to compute some elastic constant to perform the modeling, i.e., $C_{112}$, $C_{123}$, $C_{456}$, the following calculations need to be performed using $C_{111}$, $C_{144}$ and $C_{155}$. These three last elastic constants are inputs and are determined stress analysis workflow (Lei et al, 2012).

Relationships linking these parameters with $C_{112}$ and $C_{123}$ are given by the following Equations (8) and (9) as described in the document of Thurston, R. and Brugger, K, "Third-order elastic constants and the velocity of small amplitude elastic waves in homogeneously stressed media", Physical Review, Vol. 133, pp. A1604-A1610 (1964), the content of which is incorporated herein in its entirety by reference thereto.

$$C_{144} = \frac{C_{112} - C_{123}}{2}, \quad (8)$$

$$C_{155} = \frac{C_{111} - C_{112}}{4}. \quad (9)$$

The $C_{112}$ and $C_{123}$ are derived from the following Equations (19) and (11).

$$C_{112} = C_{111} - 4C_{155}, \quad (10)$$

$$C_{123} = C_{112} - 2C_{144}, \quad (11)$$

$$C_{456} = \frac{C_{111} - 3C_{112} + 2C_{123}}{8}. \quad (12)$$

3. Computation of the Strains (Step 603):

The strains are computed using the Young modulus, the Poisson's ratio and the stress magnitudes as described in the foregoing document of Mavko et al. (2009).

$$\varepsilon_{11} = \frac{1}{E}\sigma_{11} - \frac{v_{ref}}{E}\sigma_{22} - \frac{v_{ref}}{E}\sigma_{33}, \quad (13)$$

$$\varepsilon_{22} = -\frac{v_{ref}}{E}\sigma_{11} + \frac{1}{E}\sigma_{22} - \frac{v_{ref}}{E}\sigma_{33}, \quad (14)$$

$$\varepsilon_{22} = -\frac{v_{ref}}{E}\sigma_{11} + \frac{1}{E}\sigma_{22} - \frac{v_{ref}}{E}\sigma_{33}. \quad (15)$$

Where $\sigma_{11}$ is the maximal horizontal stress, $\sigma_{22}$ is the minimal horizontal stress, and $\sigma_{33}$ is the vertical stress.

4. Computation of the Reference $C^0_{55}$ (Step 604):

The second-order elastic constant $C^0_{55}$ is required to compute the anisotropic parameters. In this step, $C^0_{55}$ is computed using the following Equations (16) and (17) as described in the document of Prioul, R., Bakulin, A. and Bakulin, V., "Non-linear rock physics model for estimation of 3D subsurface stress in anisotropic formation: Theory and laboratory verification", Geophysics, Vol 69, pp. 415-425 (2004). $C^0_{55}$ is the second-order parameter for an unstressed isotropic rock as expressed by Equation (17).

$$C_{55} = C^0{}_{55} + C_{155}\varepsilon_{11} + C_{144}\varepsilon_{22} + C_{155}\varepsilon_{33}, \quad (16)$$

$$C^0{}_{55} = C_{55} - C_{155}\varepsilon_{11} - C_{144}\varepsilon_{22} - C_{155}\varepsilon_{33}, \quad (17)$$

Where C55 is determined from the dipole radial profiling as described in the document of Sinha, B., "Near-wellbore characterization using radial profiles of the shear slownesses", 74th Annual International Meeting SEG, pp. 326-329 (2004), the content of which is incorporated herein in its entirety by reference thereto. $\varepsilon_{11}$, $\varepsilon_{22}$ and $\varepsilon_{33}$ are the strains calculated by the foregoing Equations (13) to (15).

5. Computation of the Deviatoric Stress Tensor $\Delta\sigma$ (Step 605):

The principal stresses can be decomposed into a hydrostatically loaded isotropic reference state and an incremental deviatoric stresses as described in the foregoing documents of Sun et al. (2010) and Lei et al. (2012). The effective deviatoric stresses are small enough to avoid the near-wellbore failures. The stress at the reference state is denoted as $\sigma_{ref}$ and is defined by the following Equation (18) as described the foregoing document of Lei et al. (2012).

$$\sigma_{ref} = \frac{SH\max + Sh\min + SV}{3} \quad (18)$$

The deviatoric stress tensor $\Delta\sigma$ is the variation of the stress tensor from $\sigma_{ref}$. Therefore, $\Delta\sigma$ can be expressed in function of the principal stresses, SHmax, Shmin and SV, and $\sigma_{ref}$ by the following Equation (19) as described the foregoing document of Lei et al. (2012).

$$\sigma = \begin{bmatrix} SH\max - \sigma_{ref} \\ Sh\min - \sigma_{ref} \\ SV - \sigma_{ref} \end{bmatrix} \quad (19)$$

6. Build the Reference Stiffness Tensor (Step 606):

Similarly to the stress tensor described above Step 5, the stiffness tensor $C_{ij}$ can be decomposed into a stiffness tensor due to the stresses in hydrostatically loaded isotropic reference state $C_{ij\ ref}$ and into stiffness tensor due to the deviatoric stresses $\Delta C_{ij}$. The relationship linking $C_{ij}$, $C_{ij}$ ref and $\Delta C_{ij}$ is given by the following Equation (20):

$$C_{ij} = C_{ij\ ref} + \Delta C_{ij}. \quad (20)$$

The stiffness tensor at the reference state $C_{ij}$ ref is expressed as function of the P-wave ($M_{ref}$) and shear ($\mu_{ref}$) moduli at reference state by the following Equation (21). Both moduli are determined following the stress analysis workflow described in the foregoing document of Lei et al. (2012).

$$C_{ij\ ref} = \begin{bmatrix} M_{ref} & 0 & 0 & 0 & 0 & 0 \\ 0 & M_{ref} & 0 & 0 & 0 & 0 \\ 0 & 0 & M_{ref} & 0 & 0 & 0 \\ 0 & 0 & 0 & \mu_{ref} & 0 & 0 \\ 0 & 0 & 0 & 0 & \mu_{ref} & 0 \\ 0 & 0 & 0 & 0 & 0 & \mu_{ref} \end{bmatrix} \quad (21)$$

7. Computation of Stiffness Tensor $\Delta C_{ij}$ Due to the Deviatoric Stresses (Step 607):

In this step, the stiffness tensor $\Delta C_{ij}$ due to the deviatoric stresses is computed. The elements of $\Delta C_{ij}$ are computed using the following Equations (22) to (31) as described in the foregoing document of Lei et al. (2012).

$$C_{11} = A(\sigma_{11} + \sigma_{22} + \sigma_{33}) + B(\sigma_{22} + \sigma_{33}), \quad (22)$$

$$C_{22} = A(\sigma_{11} + \sigma_{22} + \sigma_{33}) + B(\sigma_{33} + \sigma_{11}), \quad (23)$$

$$C_{33} = A(\sigma_{11} + \sigma_{22} + \sigma_{33}) + B(\sigma_{11} + \sigma_{22}), \quad (24)$$

$$C_{44} = C(\sigma_{11} + \sigma_{22} + \sigma_{33}) + D(\sigma_{22} + \sigma_{33}), \quad (25)$$

$$C_{55} = C(\sigma_{11} + \sigma_{22} + \sigma_{33}) + D(\sigma_{22} + \sigma_{11}), \quad (26)$$

$$C_{66} = C(\sigma_{11} + \sigma_{22} + \sigma_{33}) + D(\sigma_{11} + \sigma_{22}), \quad (27)$$

with $$A = \frac{1}{3}\left[\frac{3C_{111} - 8C_{155} + M_{ref}}{3M_{ref} - 4\mu_{ref}} + \frac{4(C_{155} + M_{ref})}{\mu_{ref}} + 3\right], \quad (28)$$

$$B = -\frac{2(C_{155} + M_{ref})}{\mu_{ref}} - 1, \quad (29)$$

$$C = -\frac{C_{155}(M_{ref} - 2\mu_{ref}) + C_{144}(\mu_{ref} - M_{ref}) + \mu_{ref}(2M_{ref} - 3\mu_{ref})}{\mu_{ref}(3M_{ref} - 4\mu_{ref})}, \quad (30)$$

$$D = \frac{1}{2}\left(\frac{C_{155} - C_{144}}{\mu_{ref}} + 3\right). \quad (31)$$

8. Computation of the Stiffness Tensor for Anisotropic Formation Under Stress $C_{ij}$ (Step 608):

The stiffness tensor of an anisotropic formation under stress can be built using the following Equation (32), $$C_{ij} = C_{ij}ref + \Delta C_{ij}. \quad (32)$$

The computation of the stiffness tensor in hydrostatically loaded isotropic reference state $C_{ij\ ref}$ is explained (cf. Step 606), and the stiffness tensor due to the deviatoric stresses $\Delta C_{ij}$ in Step 607.

The elements of $C_{ii}$ are expressed in function the P-wave ($M_{ref}$) and shear ($\mu_{ref}$) moduli at reference state by:

For $i = 1,2,3$ $C_{ii} = M^{ref} - \Delta C_{ii}$, (33)

For $i = 4,5,6$ $C_{ii} = \mu_{ref} - \Delta C_{ii}$. (34)

Other elements of the tensor can be expressed as function of the diagonal elements of the tensor by the following Equations (35) to (38).

$$C_{12} = \frac{C_{11} + C_{22} - 4C_{66}}{2}, \quad (35)$$

$$C_{13} = \frac{C_{11} + C_{33} - 4C_{55}}{2}, \quad (36)$$

$$C_{23} = \frac{C_{22} + C_{33} - 4C_{55}}{2}, \quad (37)$$

$$C_{ij} = C_{ji}. \quad (38)$$

9. Computation of the Vertical Velocities (i.e. Slowness=1/Velocity) (Step 609):

In the Tsvankin method, velocities are expressed in function of the vertical velocities. These velocities can be computed from the stiffness tensor computed by the Equations (33) to 38) in the foregoing Step 608.

The vertical velocities are given by:

$$V_{P_0} = \sqrt{\frac{C_{33}}{\rho}}, \quad (39)$$

$$V_{S_0} = \sqrt{\frac{C_{55}}{\rho}}, \quad (40)$$

$$V_{S_1} = \sqrt{\frac{C_{44}}{\rho}}, \quad (41)$$

where $V_{P_0}$ is the vertical compressional velocity, $V_{S_0}$ is the vertical fast shear velocity, and $V_{S_1}$ is the vertical slow shear velocity.

10. Computation of the Anisotropic Parameters for Orthorhombic Media (Step 610):

Tvanskin (1997) proposed a method to describe an orthorhombic media and evaluate the formation velocities. In this method, velocities are expressed in function of the vertical velocities, as computed in the foregoing Step 609, and the anisotropic parameters. The method takes advantage of the symmetry properties of an orthorhombic configuration and decomposes the system into a transverse isotropic (TI) system for each symmetry plane (Tsvankin, 1997; cf FIG. 5). Therefore, the anisotropic parameters (i.e. Thomsen parameters) are defined for each symmetry plane. By convention, parameters in $[x_2\text{-}x_3]$ are noted with subscript (1) i.e. $\delta^{(1)}$, $\delta^{(1)}$ and $\gamma^{(1)}$, and parameters in $[x_1\text{-}x_3]$ with (2). The anisotropic parameters are defined in function on second-order elastic constants by the following Equations (42) to (47) as described in the foregoing document of Tsvankin (1997).

$$\varepsilon^{(1)} = \frac{C_{22} - C_{33}}{2C_{33}}, \quad (42)$$

$$\varepsilon^{(2)} = \frac{C_{11} - C_{33}}{2C_{33}}, \quad (43)$$

$$\gamma^{(1)} = \frac{C_{66} - C_{55}}{2C_{55}}, \quad (44)$$

$$\gamma^{(2)} = \frac{C_{66} - C_{44}}{2C_{44}}, \quad (45)$$

$$\delta^{(1)} = \frac{(C_{23} + C_{44})^2 - (C_{33} - C_{44})^2}{2C_{33}(C_{33} - C_{44})}, \quad (46)$$

$$\delta^{(2)} = \frac{(C_{13} + C_{55})^2 - (C_{33} - C_{55})^2}{2C_{33}(C_{33} - C_{55})}, \quad (47)$$

Sun and Prioul (2010) derived the Tsvankin's parameters in function of the third-order elastic constants and the stresses as expressed by the following Equations (48) to (53).

$$\varepsilon^{(1)} = \frac{C_{155}}{C_{33}C_{55}^0}(\sigma_{22} - \sigma_{33}), \quad (48)$$

$$\varepsilon^{(2)} = \frac{C_{155}}{C_{33}C_{55}^0}(\sigma_{11} - \sigma_{33}), \quad (49)$$

$$\gamma^{(1)} = \frac{C_{456}}{2C_{55}C_{55}^0}(\sigma_{22} - \sigma_{33}), \quad (50)$$

$$\gamma^{(2)} = \frac{C_{456}}{2C_{44}C_{55}^0}(\sigma_{11} - \sigma_{33}), \quad (51)$$

$$\delta^{(1)} = \varepsilon^{(1)} + \left(\frac{C_{155}}{C_{55}^0}\right)^2 \frac{1}{2C_{33}(C_{33} - C_{44})}(\sigma_{22} - \sigma_{33})^2, \quad (52)$$

$$\delta^{(2)} = \varepsilon^{(2)} + \left(\frac{C_{155}}{C_{55}^0}\right)^2 \frac{1}{2C_{33}(C_{33} - C_{55})}(\sigma_{11} - \sigma_{33})^2, \quad (53)$$

where $\sigma_{11}$ is the maximal horizontal stress, $\sigma_{22}$ is the minimal horizontal stress, and $\sigma_{33}$ is the vertical stress.

In theory, the anisotropic parameters expressed in the Tsvankin's formulation using the second-order elastic constants (Equations (42)-(47)) and the parameters in the Sun's formulation using the third-order elastic constants (Equations (48)-(53)) are equivalent. In practice, using the Tsvankin formulation to express the anisotropy in the $[x_2\text{-}x_3]$ plane and the Sun's formulation in the $[x_1\text{-}x_3]$ plane, gives better results.

In the proposed workflow, the anisotropic parameters are computed as follows:

In $[x_2\text{-}x_3]$ plane (i.e. $\varepsilon^{(1)}$, $\delta^{(1)}$ and $\gamma^{(1)}$): Tsvankin's formulation (Equations (42)-(47))

In $[x_1\text{-}x_3]$ plane (i.e. $\varepsilon^{(2)}$, $\delta^{(2)}$ and $\gamma^{(2)}$): Sun's formulation (Equations (48)-(53))

The Tsvankin method is defined for a weak anisotropy formation (i.e. $\varepsilon$, $\delta$, $\gamma < 1$). The computed anisotropic parameters verify the conditions:

$\varepsilon^{(1,2)} < 1$ $\varepsilon^{(1,2)} < 1$ $\gamma^{(1,2)} < 1$ 10. a. "Anellepticity" Parameters (Step 610*a*):

Alkhalifah and Tsvankin (1995) defined an "anellepticity" parameter $\eta$ (Equation (54)) that quantifies the effect of the anisotropy on non-hyperbolic move-out for compressional wave described in the document of Tsvankin, I., "Seismic signature and analysis of Reflection data in Anisotropic media", New York, Pergamon (2001), the content of which is incorporated herein in its entirety by reference thereto. Similarly, Sun and Prioul (2010) defined an "anellepticity" parameter H (Equation (54)) for SV wave such as:

$$\eta = \frac{\varepsilon^{(2)} - \delta^{(2)}}{1 + 2\delta^{(2)}}, \quad (54)$$

$$H = \frac{|\varepsilon^{(2)} - \delta^{(2)}|}{\gamma^{(2)}} \quad (55)$$

$$= \frac{C_{155}^2}{C_{456}C_{55}^0} \frac{C_{44}}{(C_{33} - C_{55})}|\sigma_{11} - \sigma_{33}|.$$

Both parameters measure the deviation to the elliptical anisotropic model. They quantify how anisotropic is the formation. In case of weak anisotropy, $\eta$ and H are smaller than 0.5 (Alkhalifah et al, 1995; Sun et al, 2010). Using both parameters, it is possible to confirm if the weak anisotropy assumption is met. Additional information can be found in the Quality Control as discussed elsewhere herein.

11. Computation of the Formation Velocities in Orthorhombic Media (Step 611):

The expressions of the formation velocities in function of the well deviation $\theta$ for orthorhombic media are in the following Equations (56) to (58) as described in the forgoing document of Tsvankin (1997).

$$V_p(\theta) = Vp_0(1 + \delta^{(2)}\sin^2\theta \cos^2\theta + \varepsilon^{(2)}\sin^4\theta), \quad (56)$$

$$V_{SH}(\theta) = Vs_0\sqrt{(1 + 2\gamma^{(1)}(\sin\theta)^2)}, \quad (57)$$

$$V_{SV}(\theta) = Vs_1\sqrt{(1 + 2\gamma^{(1)}(\sin\theta)^2)}, \quad (58)$$

where $Vp_0$ is the vertical compressional velocity, $Vs_0$ is the vertical fast shear velocity and $Vs_1$ is the vertical slow shear velocity, $\varepsilon^{(1)}$, $\delta^{(1)}$ and $\gamma^{(1)}$ are the anisotropic parameters in $[x_2\text{-}x_3]$ plane, and $\varepsilon^{(2)}$, $\delta^{(2)}$ and $\gamma^{(2)}$ are the anisotropic parameters in $[x_1\text{-}x_3]$ plane.

11. a. Fast Shear Azimuth (FSA) (Step 611*a*):

The fast shear azimuth FSA is defined as the polarization of the fast shear wave along the borehole direction as described in the foregoing document of Sun et al. (2010) and the documents of Esmeroy, C., Kane, M., Boyd, A. and Denoo, S., "Fracture and stress evaluation using dipole shear anisotropy logs", 36th Annual Logging Symposium, SPWLA, pp. 1-12 (1995) and Esmeroy, C., Koster, K., Williams, M., Boyd, A. and Kane, M., "Dipole Shear anisotropy logging", 64th Annual International Meeting, SEG, pp. 1139-1142 (1994), the contents of which are incorporated herein in its entirety by reference thereto.

Sun et al. (2010) demonstrated that the fast shear azimuth coincides with the singularity angle for moderate anisotropy. The singularity angle $\theta s$ is the direction where the fast and slow shear velocities are equal (Sun et al., 2010). It can be expressed in function of the stresses as in the following Equation (59).

$$\theta s = \cos^{-1}\left(\frac{Sh\min - SV}{SH\max - SV}\right) \quad (59)$$

As the Tsvankin method assumes a weak anisotropy, the fast shear azimuth is computed using the Equation (59). It is noted that the computed fast shear azimuth is in the borehole frame (i.e. in the Top-Of-Hole reference frame, cf. the foregoing Section of "Angle, rotation and reference frame"). As described above, the computed results of Tsvankin method are output at Steps 609, 610, 610*a*, 611 and 611*a*.

Slowness Estimation Using the Christoffel Method

The formation slowness (compressional, fast and slow shear velocity) can be estimated from the elastic constants (Tsvanskin, 1997). The formation velocities and the displacement vector U of plane wave satisfy the Christoffel equation expressed by the following Equation (60) as described in the document of Musgrave, M. J., "Crystal acoustics", Holden days (1970), the content of which is incorporated herein in its entirety by reference thereto.

$$[G_{ik} - \rho V^2]U_k = 0 \quad (60)$$

with $\rho$: formation bulk density,
G: Christoffel matrix; $G_{ij} = C_{ijkl} n_i n_j$,
n: Unit vector in the slowness direction.

The Equation (60) provides three solutions that correspond to the eigenvalues $\lambda i$ computed as follows:

$$[G_{ik} - \rho V^2]U_k = 0. \quad (61)$$

The largest eigenvalue is the compressional velocity while the two other eigenvalues are the fast and slow shear velocities respectively. The velocities are obtained as:

$$V_i = \sqrt{\frac{\lambda_i}{\rho}}. \quad (62)$$

The Christoffel matrix is computed from the elastic tensor $C_{ijk}$. The formation is an anisotropic formation under stress. Changes in velocities (i.e. slownesses) are mostly due to changes in the stress properties (Lei et al, 2012).

In the proposed workflow of forward modeling using the Christoffel method, the following inputs are required as listed in the foregoing Table 2.

Three third order elastic constants: $C_{111}$, $C_{144}$ and $C_{155}$,
The reference P-wave modulus: $M_{ref}$
The reference shear modulus: $\mu_{ref}$
The well trajectory (deviation and hole azimuth).

Figure 7:
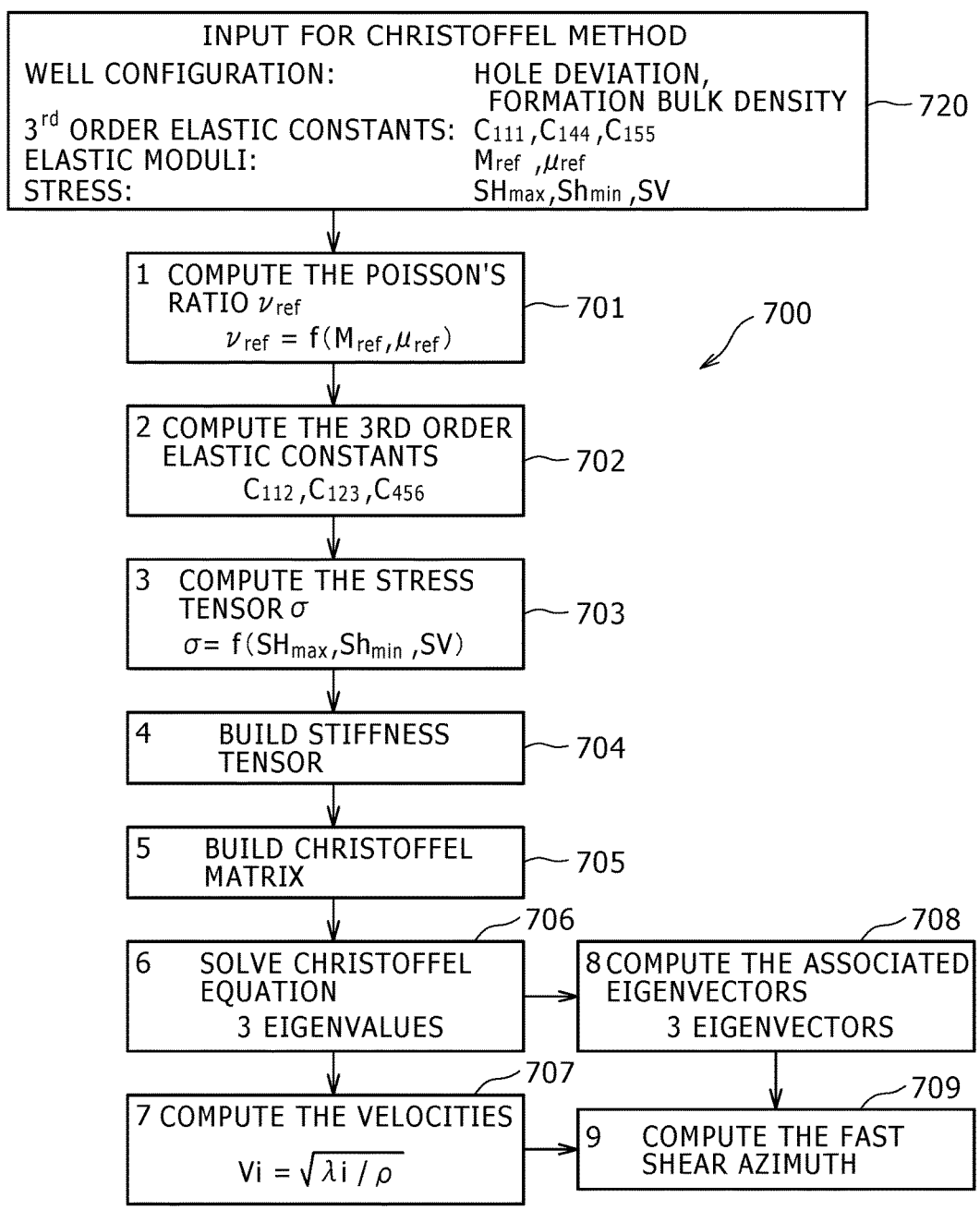
FIG. 7 is a flowchart showing details of the forward modeling using the Christoffel method according to an embodiment of the disclosure.

Referring to FIG. 7, the computation workflow 700 of forward modeling based on the Christoffel method using the inputs 720 is also described step by step.

1. Computation of Poisson's Ratio (Step 701):

Similarly to the Tsvankin method in FIG. 6, the Poisson's ratio ($v_{ref}$) is computed from the reference P-wave modulus $M_{ref}$ and the reference shear modulus $\mu_{ref}$ by the foregoing Equation (6).

2. Computation of the Third Order Elastic Constants (Step 702):

Similar to the aforementioned Tsvankin's method, $C_{112}$, $C_{123}$ and $C_{456}$ are computed by the Equation (10) to (12). The elastic constant are mandatory to build the stiffness tensor.

3. Build the Stress Tensor (Step 703):

The stress tensor is built using the stress magnitudes (Shmin, SHmax and SV) as follows:

$$\sigma = \begin{bmatrix} SH\max \\ Sh\min \\ SV \end{bmatrix}. \quad (63)$$

4. Build the Stiffness Tensor (Step 704):

The stiffness tensor is built using a stress deviatoric approach (Sun et al, 2009; Lei et al, 2012). Details of computation are explained using Equations (20) to (38) of Steps 606 to 608 of in the foregoing section of the forward modeling using Tsvankin method.

5. Build the Christoffel Matrix (Step 705):

The Christoffel matrix $G_{ij}$ is built by projecting the stiffness tensor $C_{ijkl}$ along the propagation vector, i.e., propDir expressed by:

$$G_{ij} = C_{ijkl} \times \text{propDir}(i) \times \text{propDir}(j). \quad (64)$$

The propagation vector is then given by:

$$\text{propDir} = \begin{pmatrix} \sin\theta \times \cos\varphi \\ \sin\theta \times \sin\varphi \\ \cos\theta \end{pmatrix}, \quad (65)$$

with $\theta$: hole deviation,
$\varphi$: hole azimuth.

6. Solve the Christoffel Equation (Step 706):

The Christoffel matrix is built from the $C_{ijk}$. Resolving the Christoffel's equation of the foregoing Equation (60) provides three eigenvalues $\lambda_i$ and three associated eigenvectors. These solutions provide the formation velocities and polarization vectors.

7. Computation of the Formation Velocities (i.e. Slownesses) (Step 707):

The formation velocities are computed from the eigenvalues $\lambda i$ of the Christoffel matrix. By definition, $$\lambda_i = \rho V_i^2. \tag{66}$$

Therefore, $$V_i = \sqrt{\frac{\lambda_i}{\rho}}. \tag{67}$$

The slownesses $DT_i$ are computed from the velocities Vi as follows:

$$DT_i = \frac{1}{V_i}. \tag{68}$$

8. Determination of the Polarization Vectors (Step 708):

Solutions of the Christoffel equation provides three eigenvalues and its associated eigenvectors. The eigenvectors are orthogonal and correspond to the direction of the associated waves.

In order to determine the directions of each wave, the eigenvalues are sorted and the type of the wave is attributed as function of the eigenvalue magnitude as follows:

The largest eigenvalue correspond to the compressional wave. Its associated eigenvector is the polarization vector for the compressional wave.

The second largest eigenvalue correspond to the fast shear wave. Its associated eigenvector is the polarization vector for the fast shear wave.

The smallest eigenvalues correspond to the slow shear wave. Its associated eigenvector is the polarization vector for the slow shear wave.

9. Computation of the Fast Shear Azimuth (Step 709):

The fast shear azimuth FSA is defined as the polarization of the fast shear wave along the borehole direction (Sun et al, 2010). It is defined by:

$$FSA = \arctan\left(\frac{\text{Direction of the fast shear slowness}}{\text{Direction of the slow shear slowness}}\right). \tag{69}$$

The polarization vectors are determined in the foregoing Step 708. As described above, the computed results of Christoffel method are output at Steps 707 and 709.

Quality Control

The workflow provides two "types" of formation slowness estimation: the modeled slownesses and the verticalized slownesess. Both types are computed with the Tsvankin method (Tsvankin, 1997) by the foregoing workflow in FIG. 6 for an orthorhombic formation and with the Christoffel's method (Musgrave, 1970) by foregoing workflow in FIG. 7.

The quality of these two types of modeled slownesses may be evaluated in the Quality Control (QC) process. In this case, it is proposed to:

Compare the measured formation slowness with the modeled ones,

Evaluate the type of anisotropy using the anellipticity parameters 11 and H, Compare the Fast shear azimuth (measurement and modeling).

a. Values of Having Two Methods to Compute Slownesses:

In this document, some embodiments propose to use two different methods to estimate the formation slownesses. This can be seen as a redundancy in a first view as both Tsvankin and Christoffel methods are solving the plane wave equation. The Tsvankin's method is expressed for a particular geometry (i.e. orthorhombic) for a weakly anisotropic formation. In other words, this is a special case of the Christoffel's method, and both methods should provide similar results.

In the workflow of forward modeling in FIG. 7, the slownesses are determined using the Christoffel's method. In this approach, the stress magnitudes are used to build the stiffness tensor and the Christoffel matrix C. This matrix is inverted to determine the eigenvalues and eigenvectors. Modeled slownesses are estimated from these eigenvalues. This method is powerful if the Christoffel matrix C is not singular and can be inverted. If the matrix is singular, it is not possible to inverse the matrix and the eigenvalues required to estimate slownesses cannot be determined. In this case, the Tsvankin's method is powerful as it does not perform matrix inversion: slownesses can be estimated under a weak anisotropy assumption in any case. Having the two methods is a robust approach to ensure slownesses are estimated for a given set of inputs.

In addition, computing slownesses for both methods will help users to determine if results are reliable or not. If both methods provide same results, there is good chance that results are robust. On contrary, if results are not coherent or the Christoffel's equation could not be solved, inputs might have issues, and results have to be considered with care.

b. Input:

Before running the modeling according to embodiments of the disclosure, it is important to evaluate the quality of the input in Table 2, such as the P wave (M) and shear wave (p) moduli. By definition, these moduli are linked to the compressional and shear velocities expressed by the following Equations (70) and (71) (Mavko et al., 2009).

$$V_p = \sqrt{\frac{M}{\rho}}, \tag{70}$$

$$V_s = \sqrt{\frac{\mu}{\rho}}. \tag{71}$$

For consolidated sediments such as water saturated sandstone, the Vp/Vs ratio by the following Equation (72) is expected between 1.6 and ~2.3 as described in the document of Bourbie T., C. O., "Acoustics of porous media", Houston Tex., Gulf Publishing company (1987), the content of which is incorporated herein in its entirety by reference thereto.

$$1.6 < \frac{V_p}{V_s} = \sqrt{\frac{M_{ref}}{\mu_{ref}}} < 2.3. \tag{72}$$

$M_{ref}$ and $\mu_{ref}$ providing Vp/Vs out of the range are flagged. This sanity check operation is not a sophisticated one but can help users to avoid carry on incorrect inputs due to poor processing.

c. Sensitivity of the Input Parameters:

The stress forward modeling required variables listed in Table 2 as inputs. To understand and validate the forward modeling method, the impact of these inputs on the model outcomes need to be estimated. In this perspective, the sensitivity of the model to each variable is studied. Controlled perturbation may be added on each input variables using the following Equation (73) as described in the document of Kimball, C. L., "Error analysis of maximum likelihood estimates from one or more dispersive waves", IEEE Trans. on Signal Processing, Vol 43, pp. 2928-2936 (1995), the content of which is incorporated herein in its entirety by reference thereto.

eq. 8.4 (Kimball, 1995):

$$S_k(P_0) = \left| \frac{P_k}{S} \frac{\partial S(P_0)}{\partial P_k} \right|, \quad (73)$$

where S is the modeled slowness, P is the parameter space, and Po is one of the parameters of the parameter space for which the sensitivity is evaluated.

In our case, P={SHmax, Shmin, SV, SHmax_Az, $C_{111}$, $C_{144}$, $C_{155}$, $M_{ref}$, $\mu_{ref}$, bulk density, borehole deviation, borehole azimuth} (refer to nomenclature in Table 3).

TABLE 3

NOMENCLATURE

| Abbreviation | Full name | Comments |
|---|---|---|
| AVO | Amplitude versus Offset | |
| AVAZ | Amplitude versus Azimuth | |
| DTc | Compressional slowness. | DTc = 1/Vp |
| | | Unit = μs/ft |
| DTs_fast | Fast shear slowness. | DTs_fast = 1/Vs_fast |
| | | Unit = μs/ft |
| DTs_slow | Slow shear slowness. | DTs_slow = 1/Vs_slow |
| | | Unit = μs/ft |
| FSA | Fast shear azimuth | Unit = degree |
| ISA | Integrated Stress Analysis | Software module to analyze the stress |
| $M_{ref}$ | P wave modulus at reference state | Unit = GPa |
| NEV | North-East-Vertical | Reference frame (Earth related) |
| QC | Quality control | |
| SHmax | Minimal horizontal stress magnitude | Unit = kPa |
| SHmax_Az | Azimuth of maximal horizontal stress magnitude | Unit = degree |
| Shmin | Maximal horizontal stress magnitude | Unit = kPa |
| SV | Vertical stress or overburden | Unit = kPa |
| TI | Transverse Isotropy or Transverse Isotropic | Type of formation anisotropy |
| TOH | Top of the hole | Reference frame (Borehole related) |
| Vp | Compressional velocity | Unit = m/s |
| Vs_fast | Fast shear velocity | Unit = m/s |
| Vs_slow | Slow shear velocity | Unit = m/s |
| $\mu_{ref}$ | Shear wave modulus at reference state | Unit = GPa |

A modification of variables in the parameter space P should not impact greatly the measured slownesses. This is verified by performing a sensitivity study on the measured slownesses. This study will confirm if the measured slownesses can be used to assess the quality of the modeled slownesses (see the foregoing subsection of c. Sensitivity of the input parameters).

i. Perturbation on Inputs:

In order to perform the sensitivity study, a range of perturbations is added on each input variables as summarized in Table 4. In this case, the table is an example based on real data. Parameters values are set from a real dataset in Table 4.

TABLE 4

Range of the perturbed inputs for the sensitivity study.

| Input variable | Min. value | Max. value |
|---|---|---|
| Max. horizontal stress (MPa) | 31531 | 35331 |
| Min. horizontal stress (MPa) | 30339 | 34139 |
| Vertical stress (MPa) | 32879 | 36679 |
| Azimuth of max. horizontal stress (deg) | −23.3 | −4.3 |
| C111 (GPa) | −58454 | −54654 |
| C144 (GPa) | 2700 | 6500 |
| C155 (GPa) | 1560 | 5360 |
| P wave modulus at ref. state $M_{ref}$ (GPa) | 14.25 | 33.25 |
| Shear wave modulus at ref. state $\mu_{ref}$ (GPa) | 1.59 | 3.49 |
| Measured DTc (μs/ft) | 132.0 | 227.0 |
| Measured DTs fast (μs/ft) | 316.5 | 411.5 |
| Measured DTs slow (μs/ft) | 356 | 451 |
| Rho (kg/m³) | 2.19 | 4.09 |
| Hole deviation (deg) | 0 | 19 |
| Hole azimuth (deg) | 320.0 | 339.0 | ii. Sensitivity on Slownesses:

Sensitivity of the modeled and vertical slownesses for both Tsvankin and Christoffel's methods are computed for variables in the parameter space P, using the foregoing Equation (73). Sensitivity curves of modeled slownesses for the stress magnitudes and the elastic constants are represented in FIG. 8, while sensitivities of vertical slownesses for formation and survey properties in FIG. 9.

Figure 8:
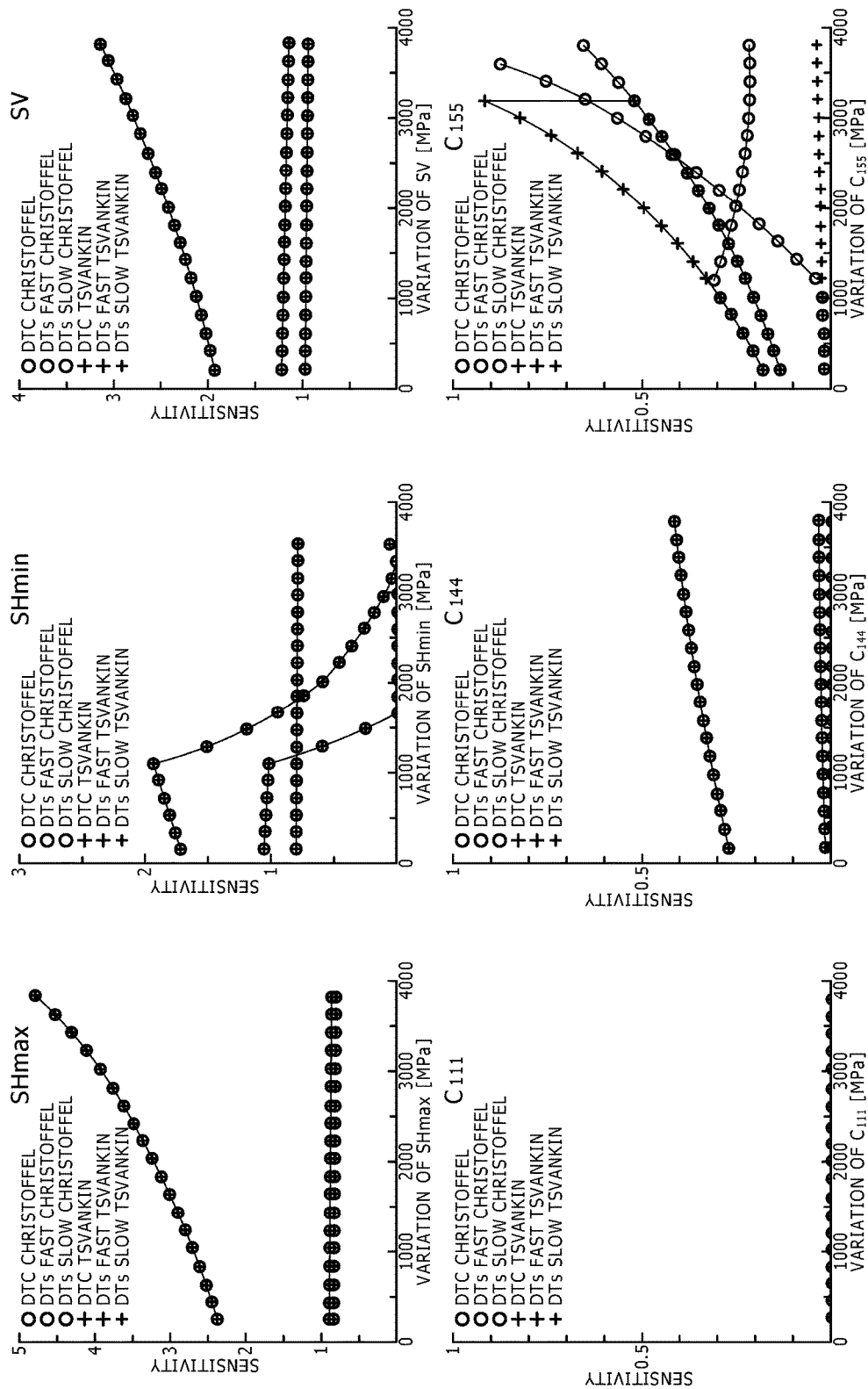
FIG. 8 shows sensitivity curves of stress magnitudes and third-order elastic constants for modeled slowness according to an embodiment of the disclosure.

In FIG. 8, sensitivities of modeled slownesses for the stress magnitudes SHmax (left), Shmin (center) and SV (right) are plotted on upper graphs, and sensitivities of modeled slownesses for the third-order elastic constants C111 (left), C144 (center) and C155 (right) are plotted on lower graphs. Curves for Christoffel and Tsvankin methods are overlaid and similar behaviors are observed for both methods. The sensitivities of all modeled slownesses are sensitive to variations in stress magnitudes, while the modeled slownesses are not sensitive to $C_{111}$ (left) and sensitive to $C_{144}$ (center) and $C_{155}$ (right).

Figure 9:
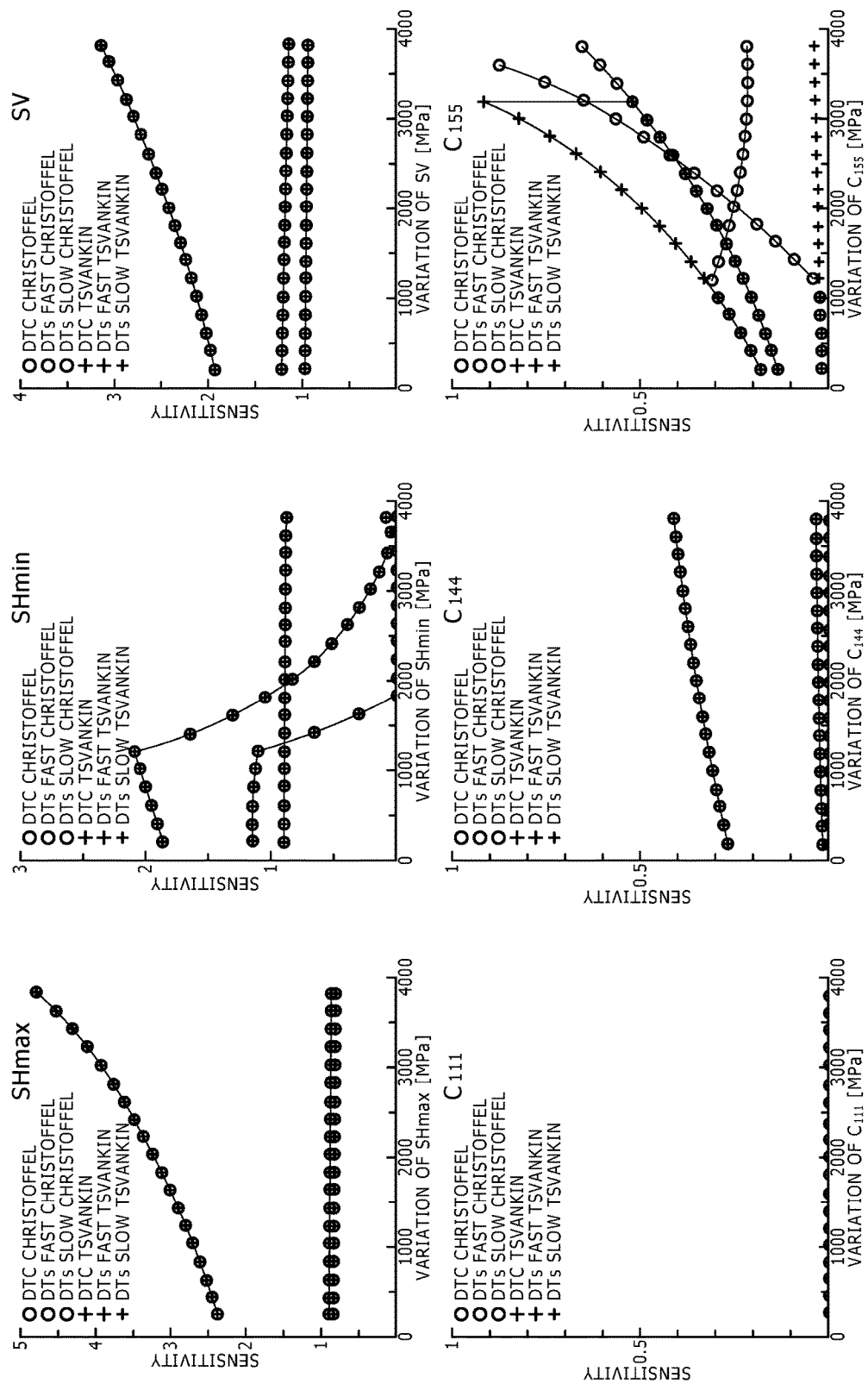
FIG. 9 shows sensitivity curves of stress magnitudes and third-order elastic constants for vertical slowness according to an embodiment of the disclosure.

In FIG. 9, sensitivities of vertical slownesses for the stress magnitudes SHmax (left), Shmin (center) and SV (right) are plotted on upper graphs, and sensitivities of vertical slownesses for the third-order elastic constants $C_{111}$ (left), $C_{144}$ (center) and $C_{155}$ (right) are plotted on lower graphs. The sensitivities of all vertical slownesses are sensitive to variations in stress magnitudes, while the vertical slownesses are not sensitive to $C_{111}$ (left) and sensitive to $C_{144}$ (center) and $C_{155}$ (right).

Impacts of perturbation on input parameters are summarized in Table 5 and Table 6. Table 5 is a summary of input parameters that impacts the measured slowness and Table 6 is a summary of input parameters that impacts the vertical slowness. In these tables, parameters that affects the slownesses are ticked with a ✓ mark, parameters with effects are ticked with a x mark, and parameters with negligible impact are ticked with a ◊ mark.

TABLE 5

Summary of input parameters that impacts the measured slownesses.

| variables | Modeled slowness - Christoffel | | | Modeled slowness - Tsvankin | | |
|---|---|---|---|---|---|---|
| | Compressional | Fast shear | Slow shear | Compressional | Fast shear | Slow shear |
| Base | | | | | | |
| $C_{111}$ | x | x | x | x | x | x |
| $C_{144}$ | x | ✓ | ✓ | x | ✓ | ✓ |
| $C_{155}$ | ✓ | ✓ | ✓ | ✓ | ✓ | ✓ |
| Max. horizontal stress | ✓ | ✓ | ✓ | ✓ | ✓ | ✓ |
| Min. horizontal stress | ✓ | ✓ | ✓ | ✓ | ✓ | ✓ |
| Vertical stress | ✓ | ✓ | ✓ | ✓ | ✓ | ✓ |
| Azimuth of max. horizontal stress | x | x | x | x | x | x |
| Measured compressional slowness | x | x | x | x | x | x |
| Measured fast shear slowness | x | x | x | x | x | x |
| Measured slow shear slowness | x | x | x | x | x | x |
| P wave modulus at ref. state $M_{ref}$ | ✓ | x | x | ✓ | x | x |
| Shear wave modulus at ref. state $\mu_{ref}$ | ✓ | ✓ | ✓ | ✓ | ✓ | ✓ |
| Hole azimuth | x | x | x | x | x | x |
| Hole deviation | ◇ | ◇ | ◇ | ◇ | ◇ | ◇ |
| Bulk density | ✓ | ✓ | ✓ | ✓ | ✓ | ✓ |

TABLE 6

Summary of input parameters that impacts the vertical slownesses.

| variables | Vertical slowness - Christoffel | | | Vertical slowness - Tsvankin | | |
|---|---|---|---|---|---|---|
| | Compressional | Fast shear | Slow shear | Compressional | Fast shear | Slow shear |
| Base | | | | | | |
| $C_{111}$ | x | x | x | x | x | x |
| $C_{144}$ | x | ✓ | ✓ | x | ✓ | ✓ |
| $C_{155}$ | ✓ | ✓ | ✓ | ✓ | ✓ | ✓ |
| Max. horizontal stress | ✓ | ✓ | ✓ | ✓ | ✓ | ✓ |
| Min. horizontal stress | ✓ | ✓ | ✓ | ✓ | ✓ | ✓ |
| Vertical stress | ✓ | ✓ | ✓ | ✓ | ✓ | ✓ |
| Azimuth of max. horizontal stress | x | x | x | x | x | x |
| Measured compressional slowness | x | x | x | x | x | x |
| Measured fast shear slowness | x | x | x | x | x | x |
| Measured slow shear slowness | x | x | x | x | x | x |
| P wave modulus at ref. state $M_{ref}$ | ✓ | x | x | ✓ | x | x |
| Shear wave modulus at ref. state $\mu_{ref}$ | ✓ | ✓ | ✓ | ✓ | ✓ | ✓ |
| Hole azimuth | x | x | x | x | x | x |
| Hole deviation | x | x | x | x | x | x |
| Bulk density | ✓ | ✓ | ✓ | ✓ | ✓ | ✓ |

Modeled slownesses are highly sensitive to stress magnitudes, SHmax, Shmin and SV and sensitive to the elastic constants ($C_{144}$ and $C_{155}$; cf. FIG. 8). This is an expected result as the initial assumption considers that slowness changes are only due to stress changes. Stress magnitudes and elastic constants are the parameters that will impact the modeled slownesses.

Figure 10:
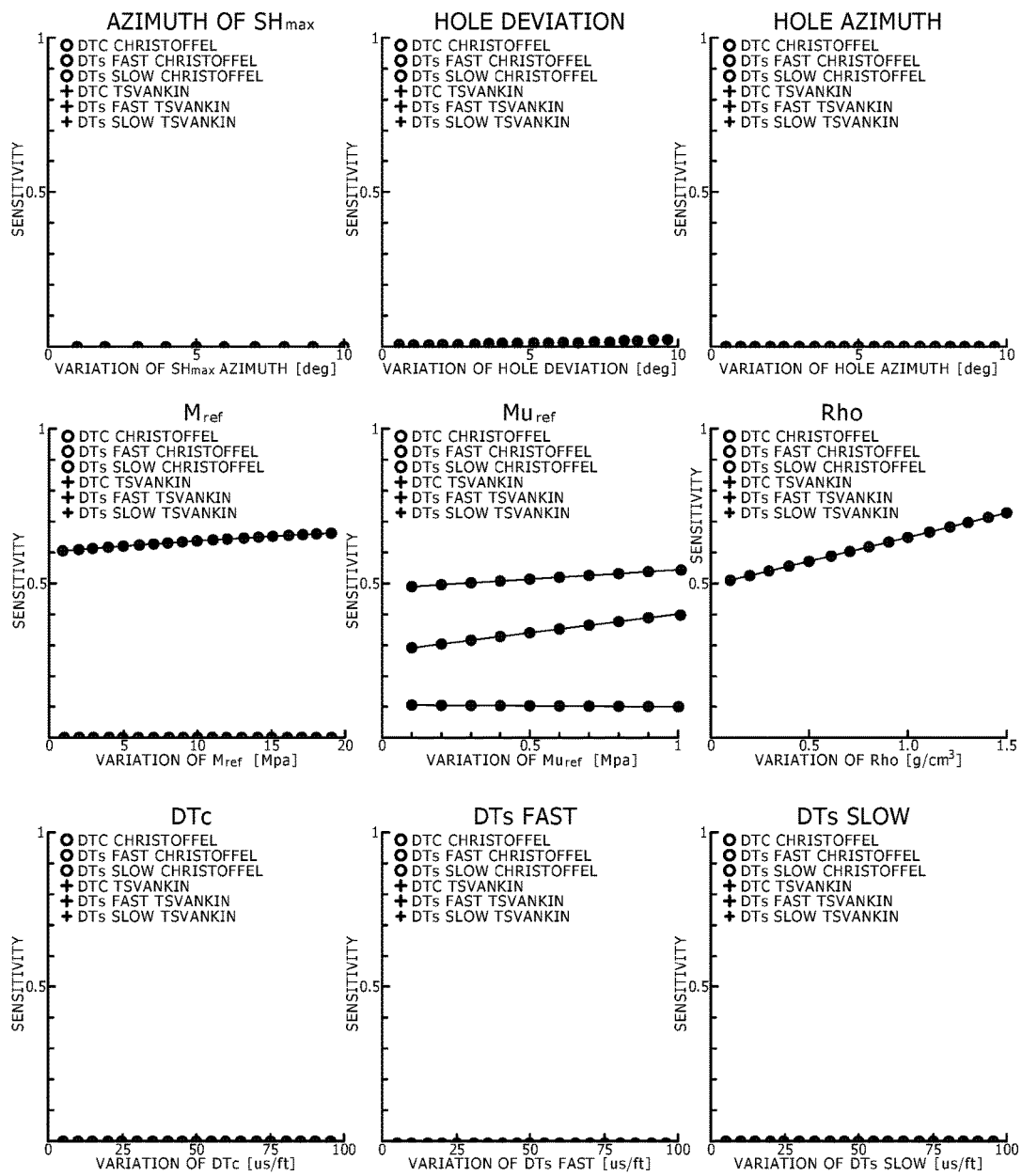
FIG. 10 shows sensitivity curves of formation and survey properties for modeled slowness according to an embodiment of the disclosure.
Figure 11:
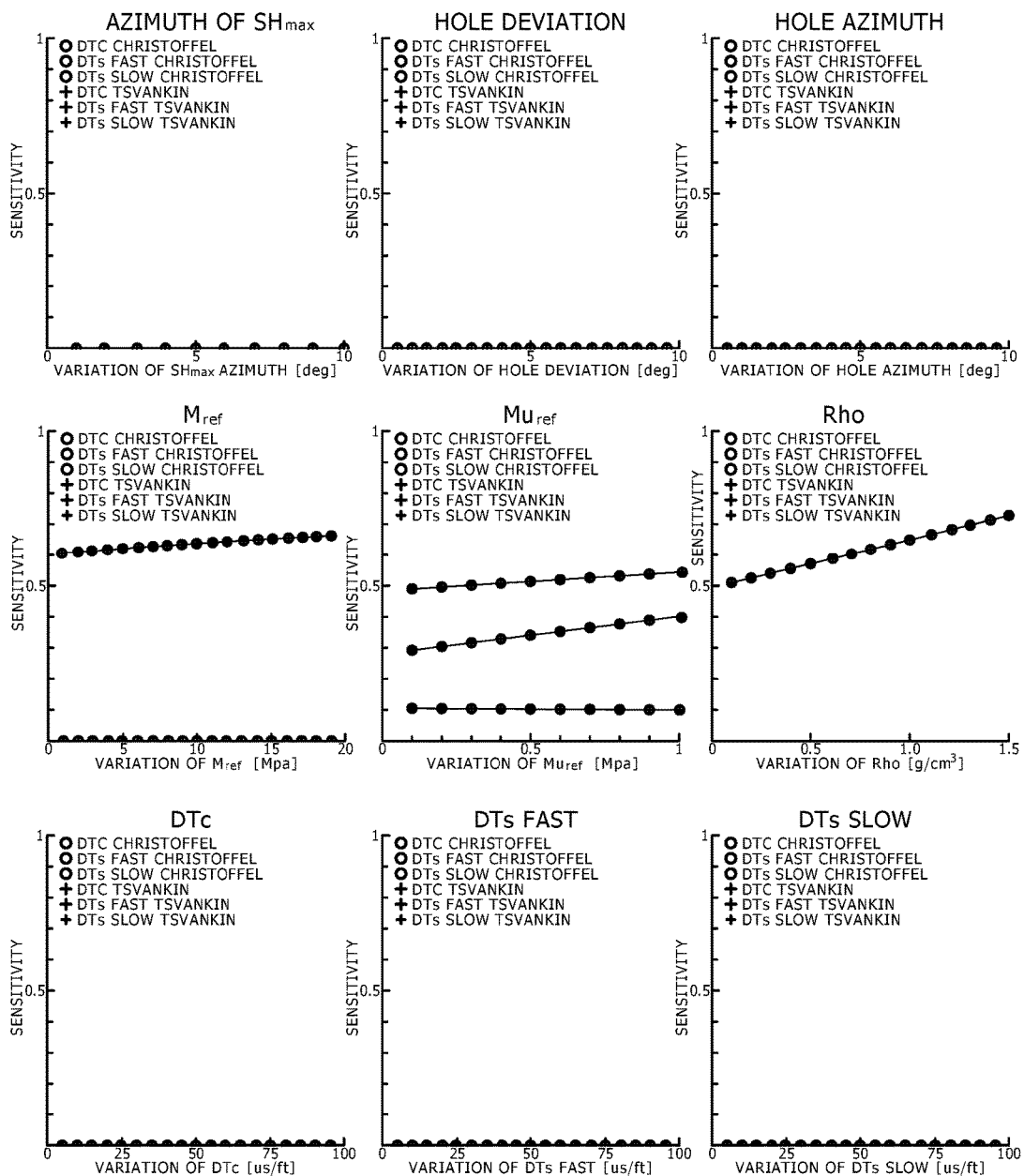
FIG. 11 shows sensitivity curves of formation and survey properties for vertical slowness according to an embodiment of the disclosure.

The modeled slowness is less sensitive to the formation properties as shown FIG. 10. In FIG. 10, sensitivity curves of modeled slowness for azimuth of max. Stress magnitude SHmax (left), hole deviation (center) and hole azimuth (right) are plotted on upper graphs. Sensitivity curves of modeled slowness for P-wave modulus (left), Shear wave modulus (center) and bulk density (right) are plotted on middle graphs. Sensitivity curves of modeled slowness for the measured compressional (left), fast shear (center) and slow shear (left) are plotted on lower graphs. FIG. 11 shows sensitivities of vertical slownesses for the formation properties.

As shown in FIGS. 10 and 11, impact of angles (SHmax, hole deviation, hole azimuth) is limited on the modeled slownesses and vertical slownesses. Formation properties such as P-wave modulus, Shear wave modulus and bulk density have an impact on both of the modeled slownesses and vertical slownesses. No sensitivity of both slownesses to the measured compressional, fast shear and slow shear slowness is observed. Both slownesses and measurements are independent.

As expected, the P wave modulus ($M_{ref}$) impacts the compressional slowness, whereas the shear modulus ($\mu_{ref}$) affect the shear slownesses as indicated by the foregoing Equations (70) and (71). Changes of the formation density has an impact of the modeled compressional and shear slownesses.

d. Slowness:

In the proposed workflow of the disclosure, modeled and vertical slownesses for an anisotropic formation under stress are computed using Tsvankin and Christoffel methods. The quality of those slownesses needs to be assessed. The modeled slownesses are computed in the borehole orientation and can be directly compared to measured slownesses by computing a normalized difference by the following Equation (74). For vertical slownesses, it is necessary to project the measured slownesses on the vertical axis. Once the correction is performed, the modeled vertical slownesses and the measured slownesses can be compared such as, $$\text{Normalized difference} = \frac{(V_{model} - V_{measurement})}{V_{measurement}} \qquad (74)$$

If the normalized difference is small, then the modeled and measured slowness are in good agreement.

To ensure that computed results are correct, it can be useful to compare the trends of the measured and modeled slownesses over a large depth interval. The trends are computed by calculating the correlation between the model and the measurements logs. High correlation value will provide confidence in the modeled results.

e. Anellipticity Parameters:

The anellipticity parameters indicate how the formation is anisotropic and allow verifying if the weak anisotropy assumption is valid (Sun et al., 2010). The parameter η expressed by Equation (75) measures the anisotropy that effects on the compressional wave whereas the H parameter expressed by Equation (76) measures the effect on SV wave. The anellipticity parameters are computed as:

$$\eta = \frac{\varepsilon^{(2)} - \delta^{(2)}}{1 + 2\delta^{(2)}}, \qquad (75)$$

$$H = \frac{|\varepsilon^{(2)} - \delta^{(2)}|}{\gamma^{(2)}} \quad (76)$$

$$= \frac{C_{155}^2}{C_{456}C_{55}^0} \frac{C_{44}}{(C_{33} - C_{55})} |\sigma_{11} - \sigma_{33}|.$$

The characteristic values of each parameters are:

Anellipticity parameter $\eta$ (compressional wave; Alkhalifah et al., 1995)
  $\eta = 0$: formation is isotropic
  $\eta \neq 0$: formation is anisotropic
  $\eta < 0.5$: weak anisotropy Anellipticity parameter H (shear vertical wave; Sun et al., 2010)
  Indicates how the singularity angle and the fast shear azimuth are aligned.
  $0 \leq H \leq 0.1$: Sun et al. (2010) demonstrated using rock samples that fast shear azimuth and the singularity angle.
  $H < 0.5$: weak anisotropy Applications of the Stress Forward Modeling The method proposed in this work is a powerful tool to evaluate the effects of stress on anisotropic formation.

It can help to:

Evaluate the impact of the stresses, SHmax, Shmin and SV, as well as of the third-order elastic constants, $C_{111}$, $C_{144}$ and $C_{155}$, on the slowness measurements.

Provide vertical slowness logs for mixed formation composed by transverse isotropic (TI) formation and anisotropic formation under stress.

It can be used to invert some of the petrophysics parameters and therefore ease the interpretation of the recorded logs.

The impacts of the stresses and the elastic constants on the formation slowness and anisotropy is evaluated by studying the input sensitivity. A vertical log for a mixed formation can be obtained by combining the "TI characterization" workflow and stress forward modeling.

a. Workflow for Sensitivity Study:

The stress forward model module computes the formation slowness for an anisotropic formation under stress. It requires inputs listed in Table 2.

The main outputs of the modeling are:

Estimation of the formation slownesses for given borehole orientation

Estimation of the slownesses on the true vertical axis (i.e. vertical slowness)

In this embodiment, the impact of input parameters on modeling results is estimated. This analysis is purposed to be used to evaluate the range of uncertainty to a given input. Such knowledge on input user parameters may provide to log analyst a way to estimate the confidence in data used to perform this processing.

Figure 12:
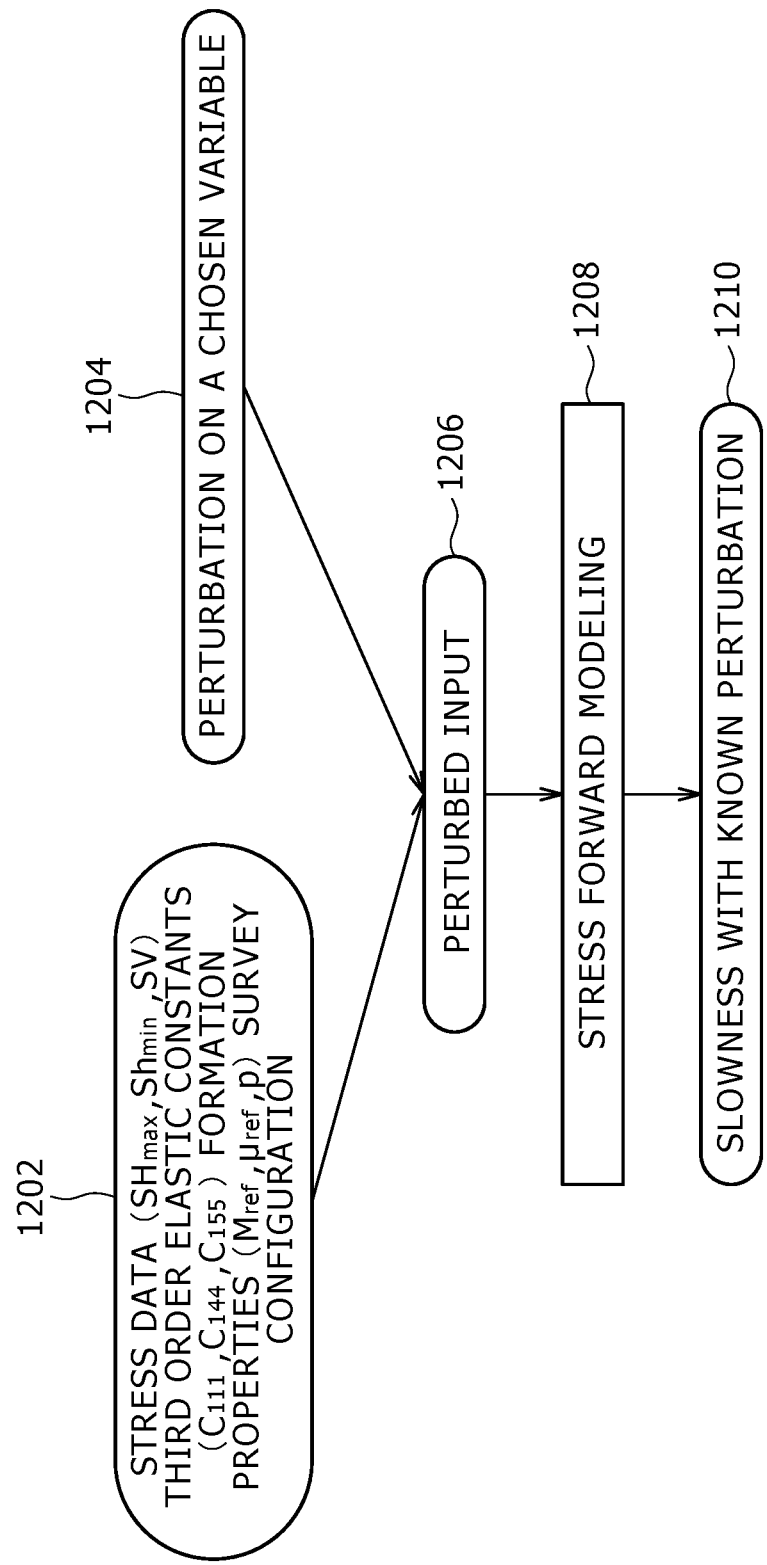
FIG. 12 illustrates one example of workflow for sensitivity study according to embodiments of the disclosure.

FIG. 12 illustrates one example of workflow for sensitivity study. One variable of the input set in Table 2 is chosen and perturbed. Stress forward model is run for the perturbed input. Outputs of the stress forward model are the slowness with known perturbation.

Referring to FIG. 12, steps to estimate the errors are as follows:

1. Select the variable (var0) to study (Step 1202). For example, the maximal horizontal stress magnitude is selected.

2. Add the perturbation (var0±perturbation) on the selected variable (Step 1204).

3. Run the stress forward modeling for var0, var0+perturbation and var0−perturbation (Steps 1206 and 1208).

Three slowness logs are obtained (Step 1210): one is the main log without perturbation (i.e. log for var0), the two others are the logs with the errors (i.e. log for var0±perturbation).

Figure 13:
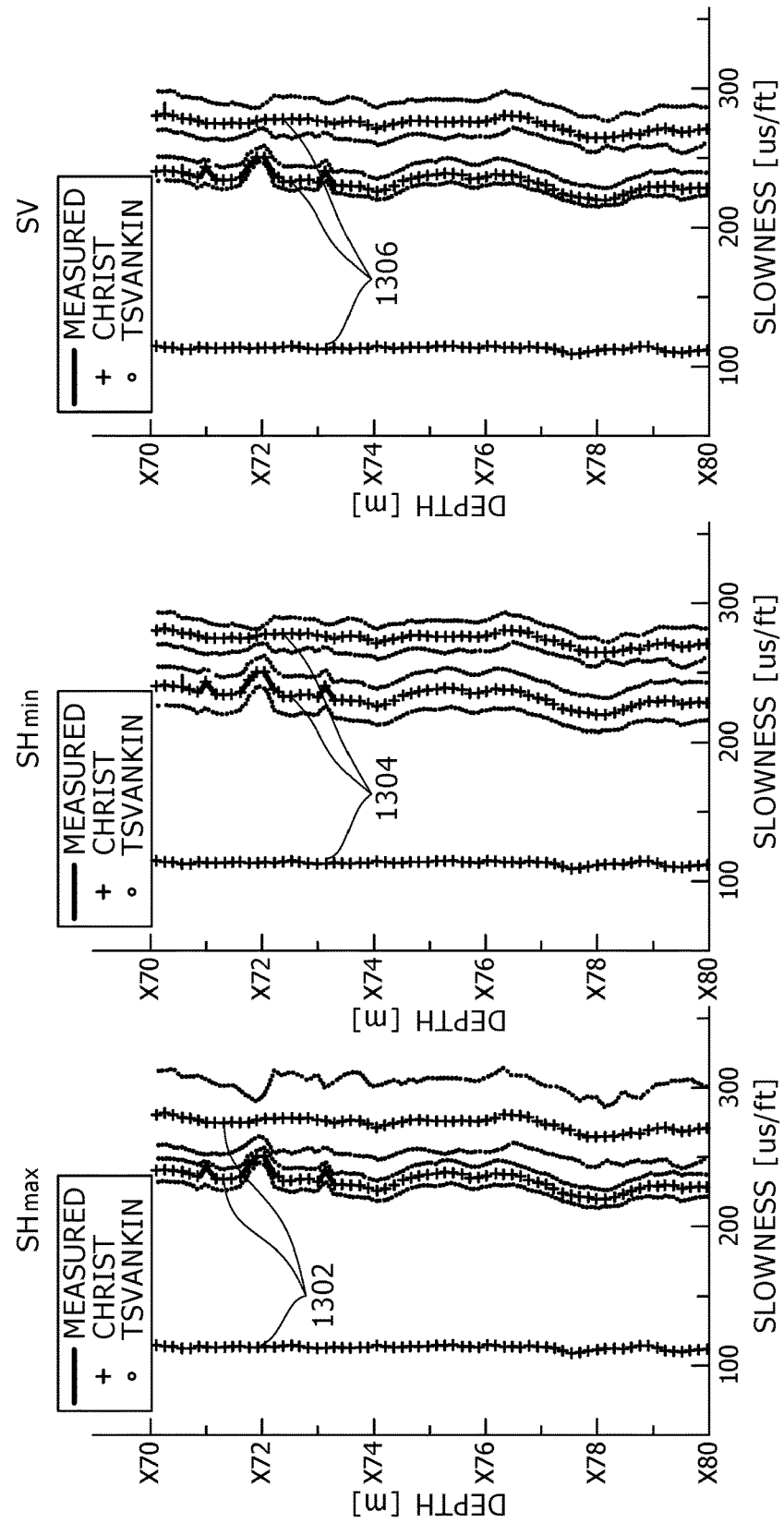
FIG. 13 shows examples of perturbed inputs on slowness log according to an embodiment of the disclosure.

Example of logs with uncertainty curves are shown in FIG. 13. Stress magnitudes (SHmax, Shmin and SV) are perturbed (Left: perturbation on SHmax; Middle: perturbation on shmin; Right: perturbation on SV). Perturbations applied on each magnitude is ±10%. The logs without perturbation is represented by curves 1302-1306. The curves encapsulating the curves 1302-1306 correspond to the perturbed logs. Curves on the left side of the curved logs 1302-1306 corresponds to the −10% perturbation, curves on the right side to the +10% perturbation. In this example, the perturbation on stress magnitude has little effect on compressional slowness (~110 µs/ft), and obvious effects on the fast (~220 µs/ft) and slow (270 µs/ft) shear slowness. As shown in FIG. 13, this approach provides some error bars on the modeled slownesses and can be use later on to QC the input logs used in this modeling.

b. Combining logs from "TI characterization" workflow and stress forward modeling: The stress forward modeling is powerful to model an anisotropic formation under stress. Equivalent tool to study a transverse isotropic (TI) formation exists and is named "TI characterization" workflow (Jocker et al., 2013). If the target formation is transverse isotropic, interpreters will use the "TI characterization" method. In most cases, formation is more complex and can be composed by mixed types of formation (i.e. transverse isotropic formation and anisotropic formation under stress). In such situation, the workflow will automatically switch from a TI workflow to the stress-anisotropy workflow.

Figure 14:
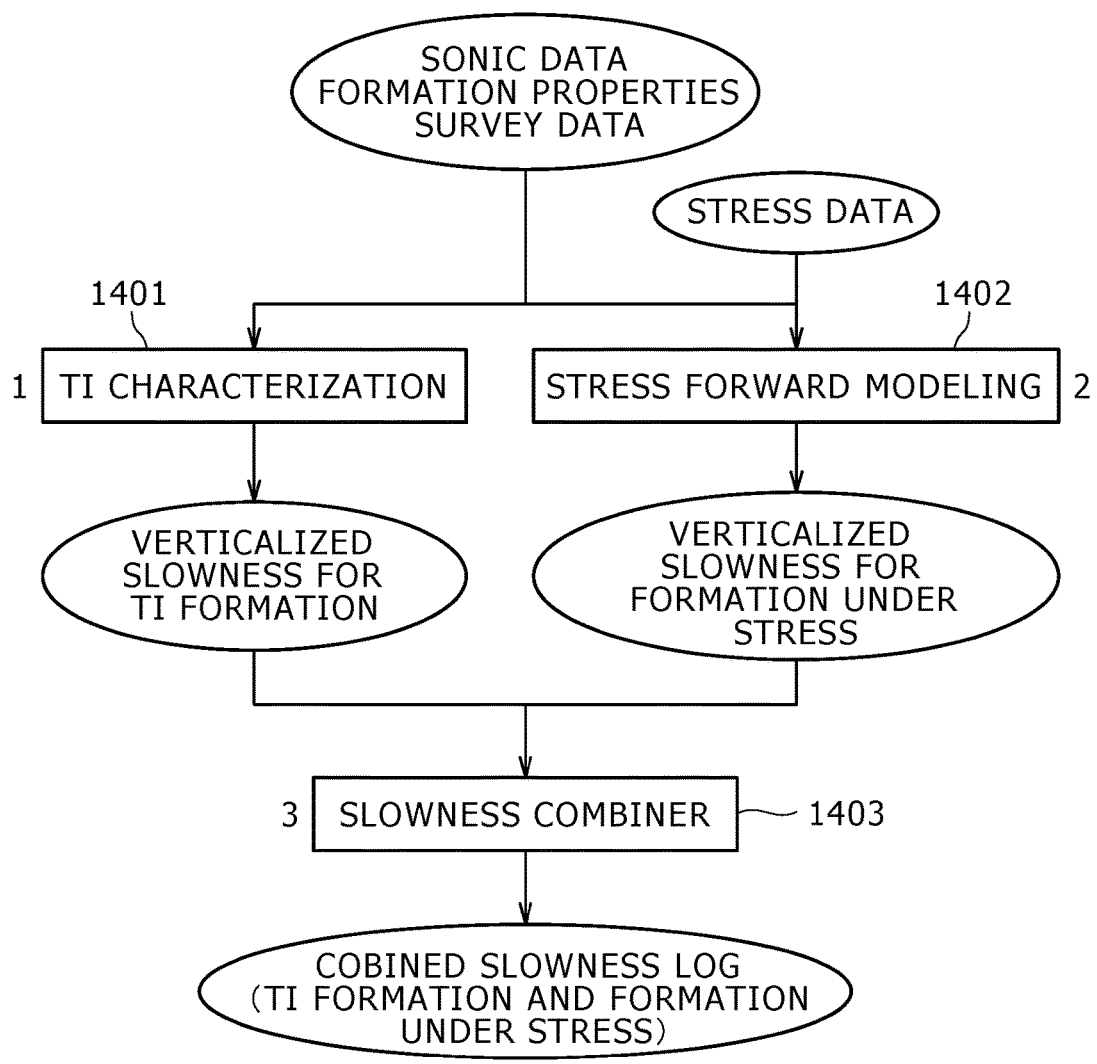
FIG. 14 illustrates one example of workflow to study a mixed type formation according to embodiments of the disclosure.

The method to combine logs resulting from "TI characterization" and the stress forward modeling may be exposed as shown in FIG. 14. It is noted that combining logs is only possible if the logs resulting from both workflows are defined along the same axis. Concretely, it means that the slownesses concerned in this workflow are the slownesses defined along the true vertical (i.e. vertical slownesses).

FIG. 14 shows an example of workflow to study a mixed type formation (i.e. composed by a transverse isotropic (TI) formation and anisotropic formation under stress). Transverse isotropic zone is characterized by the "TI characterization" module 1401 and the anisotropic formation under stress is characterized by the "Stress forward modeling" module 1402. Both modules provide the vertical slowness logs for the respective types of formation. These logs are combined in the "Slowness combiner" module 1403. The slowness resulting from the combiner module 1403 is the vertical slowness computed with "TI characterization" at the transverse isotropic zone and the vertical slowness computed with the "Stress forward modeling" at the anisotropic zone under stress.

Referring to FIG. 14, steps to combine the TI and stress slowness logs are as follows:

1. "TI characterization" is run for the entire log (Step 1401). Vertical slownesses for transverse isotropic formation are stored.

2. "Stress forward modeling" is run for the zones under stress (Step 1402). Vertical slownesses are stored with the zone information.

3. Zones where the formation in under stress are flagged in Step 1402. In these zones, the vertical slownesses in the slowness logs from the "TI characterization" workflow (computed in step 1) are replaced by the vertical slownesses computed in Step 1402. The recomposed log is saved and is the combined vertical slowness for a mixed formation (Step 1403).

Figure 15:
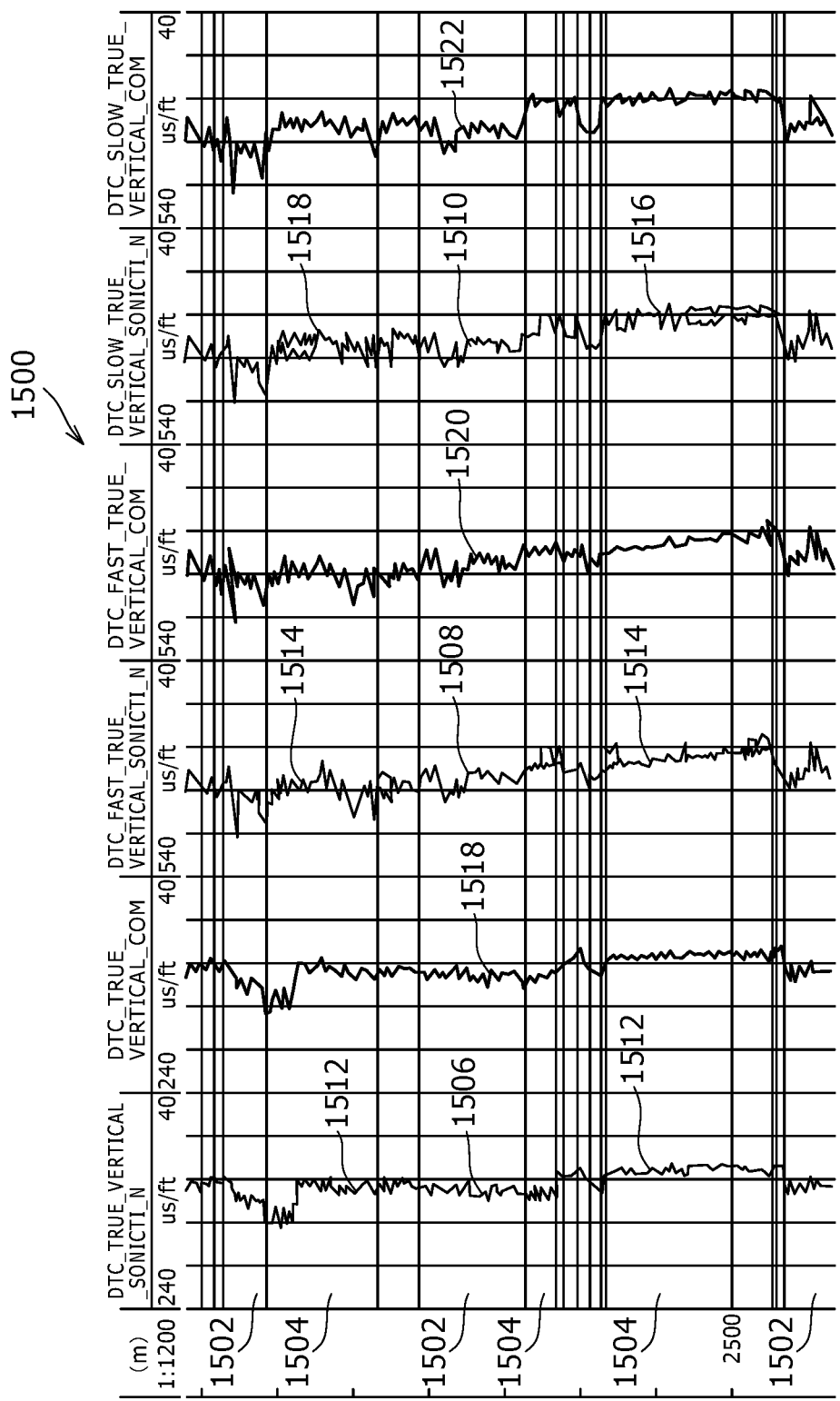
FIG. 15 shows examples of vertical slowness logs for a mixed formation according to an embodiment of the disclosure.

FIG. 15 shows an example of vertical slowness logs 1500 for a mixed (i.e. transverse isotropic and anisotropic formation under stress) formation. Zones 1502 with white background are transverse isotropic formation, zones 1504 with anisotropic formation under stress are in grey. Logs with lines 1506-1510 are outputs from the "TI characterization" (Compressional 1506, fast shear 1508 and slow shear 1510). Logs with lines 1512-1516 are outputs from the "Stress forward modeling" (Compressional 1512, fast shear 1514 and slow shear 1516) obtained for the transverse isotropic formation, zones 1504 in gray zone. On the right of the colored log 1506-1516, the final combined log 1518-1522 are represented in black (Compressional 1518 in 2nd track; fast shear 1520 in 4th track and slow shear 1522 in 6th track).

c. Applications to Other Domains:

In some embodiments, the proposed method of the disclosure may be exposed to characterize an anisotropic formation under stress. Outputs of the proposed method provide useful information on the formation acoustic and anisotropic properties that can be used in other domains such as seismic and/or geomechanics.

c-i. Seismics:

Slownesses on the Earth vertical axis is an important input in seismic domains. They are required to build velocity models and synthetics seismograms. In addition, they can be used for advanced seismic processing such as Amplitude-Versus-Offset (AVO) or/and Amplitude-Versus-Azimuth (AVAZ) modeling. Errors in the velocity model will have large impacts on the final reservoir imaging: a wrong model will lead to wrong depth correction, meaning a wrong depth estimation of the reservoir.

The workflow proposed in this paper can provide an optimal slowness log (i.e. velocity) not only for anisotropic formation under stress, but also for mixed formation (i.e. formation is partly TI, and partly anisotropic under stress). It will help seismic interpreters to build an accurate velocity model corrected from the formation anisotropy.

c-ii. Geomechanics:

Reservoir compaction, overburden stretching, reservoir compartmentalization, fracturing in the reservoir seal, activation of faults, changes of porosity and permeability are phenomena with large impact that can occur during well production. It is important to understand in what conditions these phenomena can occur to minimize the associated risks while producing the well. If one of these phenomena happens, stress changes can be observed: understanding the effect of stress changes will help to understand and monitor the reservoir as described in the foregoing documents of Donald and Prioul (2015) and Herwanger et al. (2009). The workflow proposed in the disclosure estimates the slownesses for a given stress state. It can be used to predict the anisotropic slowness changes and help reservoir monitoring.

Figure 16:
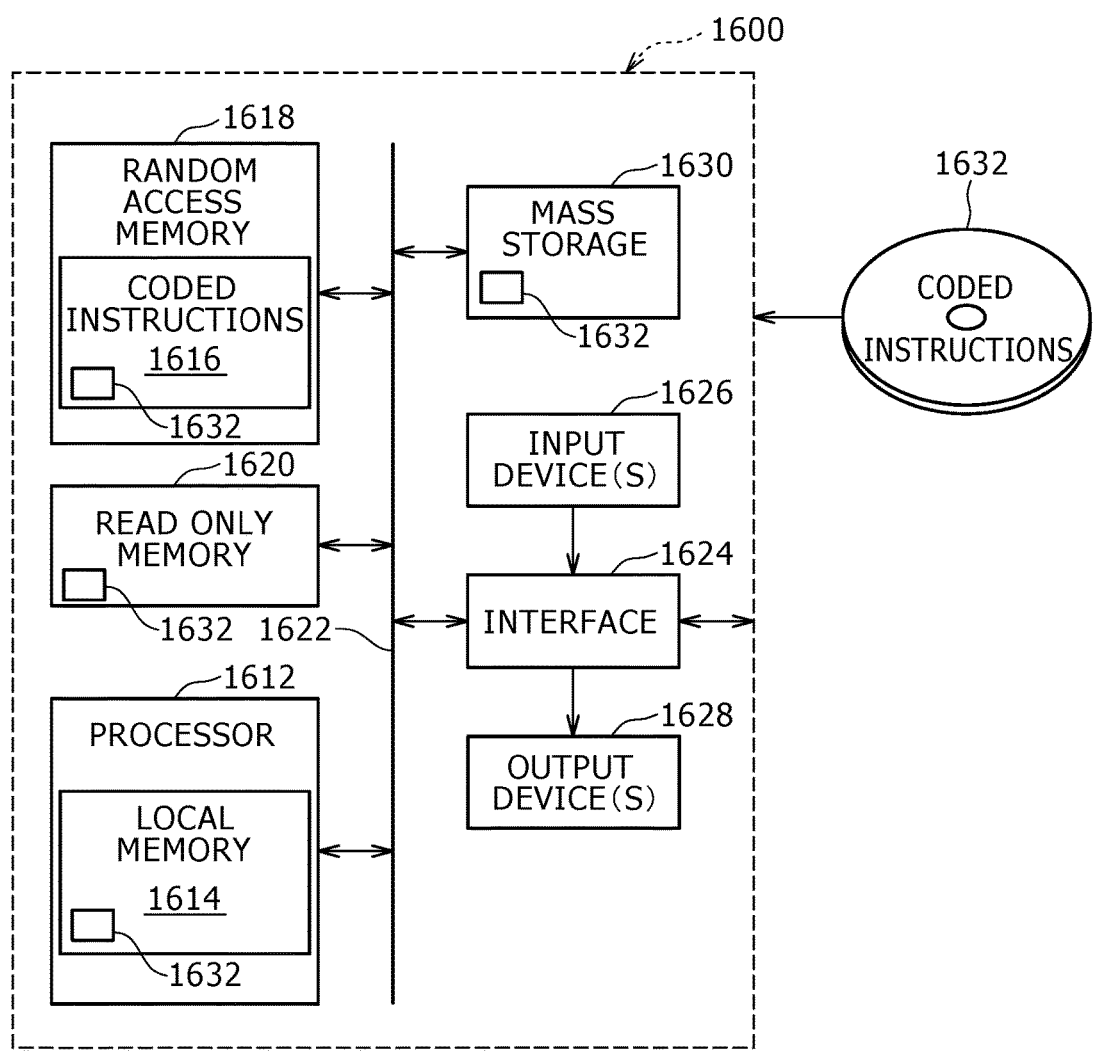
FIG. 16 illustrates a schematic block diagram showing one example of a system for estimating formation slowness according to embodiments of the disclosure.

FIG. 16 is a block diagram of an example processing system 1600 capable of implementing the apparatus and methods disclosed herein. The processing system 1600 can be, for example, a server, a personal computer, a personal digital assistant (PDA), a smartphone, an Internet appliance, etc., or any other type of computing device.

The system 1600 of the instant example includes a processor 1612 such as a general purpose programmable processor. The processor 1612 includes a local memory 1614, and executes coded instructions 1616 present in the local memory 1614 and/or in another memory device. The processor 1612 may execute, among other things, machine-readable instructions to implement the processes represented in FIGS. 1-15. The processor 1612 may be any type of processing unit, such as one or more Intel® microprocessors from the Pentium® family, the Itanium® family and/or the XScale® family, one or more microcontrollers from the ARM® and/or PICO families of microcontrollers, etc. Of course, other processors from other families are also appropriate.

The processor 1612 is in communication with a main memory including a volatile memory 1618 and a non-volatile memory 1620 via a bus 1622. The volatile memory 1618 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1620 may be implemented by flash memory and/or any other desired type of memory device. Access to the main memory 1618, 1620 is controlled by a memory controller (not shown).

The processing system 1600 also includes an interface circuit 1624. The interface circuit 1624 may be implemented by any type of interface standard, such as an Ethernet interface, a universal serial bus (USB), and/or a third generation input/output (3GIO) interface.

One or more input devices 1626 are connected to the interface circuit 1624. The input device(s) 1626 permit a user to enter data and commands into the processor 1612. The input device(s) can be implemented by, for example, a keyboard, a mouse, a touchscreen, a track-pad, a trackball, an isopoint and/or a voice recognition system.

One or more output devices 1628 are also connected to the interface circuit 1624. The output devices 1628 can be implemented, for example, by display devices (e.g., a liquid crystal display, a cathode ray tube display (CRT)), by a printer and/or by speakers. The interface circuit 1624, thus, includes a graphics driver card.

The interface circuit 1624 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1600 also includes one or more mass storage devices 1630 for storing machine-readable instructions and data. Examples of such mass storage devices 1630 include floppy disk drives, hard drive disks, compact disk drives and digital versatile disk (DVD) drives. In some examples, the mass storage device 1630 may store the set of input waveforms 708. In some examples the volatile memory 1618 may store the set of input waveforms 708.

The coded instructions 1632 for data processing in FIGS. 1-15 may be stored in the mass storage device 1630, in the volatile memory 1618, in the non-volatile memory 1620, in the local memory 1614 and/or on a removable storage medium, such as a CD or DVD 1632.

As an alternative to implementing the methods and/or apparatus described herein in a system such as the processing system of FIG. 16, the methods and or apparatus described herein may be embedded in a structure such as a processor and/or an ASIC (application specific integrated circuit).

Figure 17:
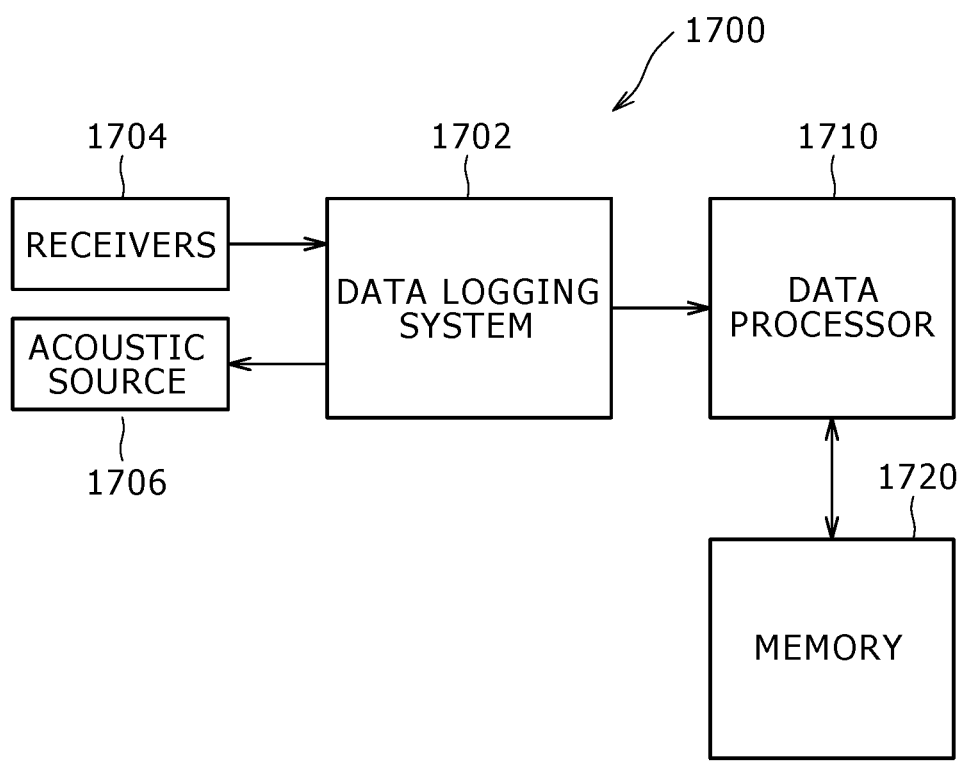
FIG. 17 illustrates a schematic block diagram showing one example of a sonic measurement system according to embodiments of the disclosure.

Referring to FIG. 17, the system 1700 to estimate formation slowness in presence of anisotropy and/or stress may comprise a data logging system 1702, acoustic receivers (vibration sensors) 1704 located in the wellbore, an acoustic source 1706 of generating vibrations to be received with the receivers 1704, a data processor 1710 such as a computer apparatus, and a memory 1720. For example, the data logging system 1702 may comprise one or more modules in the foregoing tool and tubing/cable. The receivers 1704 such as the downhole array of multiple receivers or the DVS may be installed in the foregoing tool and coupled with the data logging system 1702 via the tubing/cable. The acoustic source 1706 such as the foregoing one or more sources may be coupled with the data logging system 1702 so that the generation of vibrations can be controlled.

The acoustic waves detected with the receivers 1704 may be transmitted to the data logging system 1702 via the tubing/cable and the data logging system 1702 may produce a data log of acoustic waves (vibrations) received at the receivers 804. The data processor 1710 may be coupled with the data logging system 1702 via a cable or a network so as to be received the data log from the data logging system 1702. The data processor 1710 may be implemented by one or more circuit(s), programmable processor(s), application specific integrated circuit(s) (ASIC(s)), programmable logic device(s) (PLD(s)) and/or field programmable logic device(s) (FPLD(s)), etc.

The data log may be transferred from the data logging system 802 to the data processor 1710 via a storage medium such as a USB memory, a memory card, a magnetic tape or disk, an optical disk, etc. The data processor 1710 may be also installed within the data logging system 1702. The sonic data such as waveforms are temporarily or permanently stored in the memory 1720 which is a tangible computer readable medium such as a memory, digital versatile disk (DVD), compact disk (CD), etc. Software and/or firmware including instructions for processing the sonic data are also stored in the memory.

Figure 18:
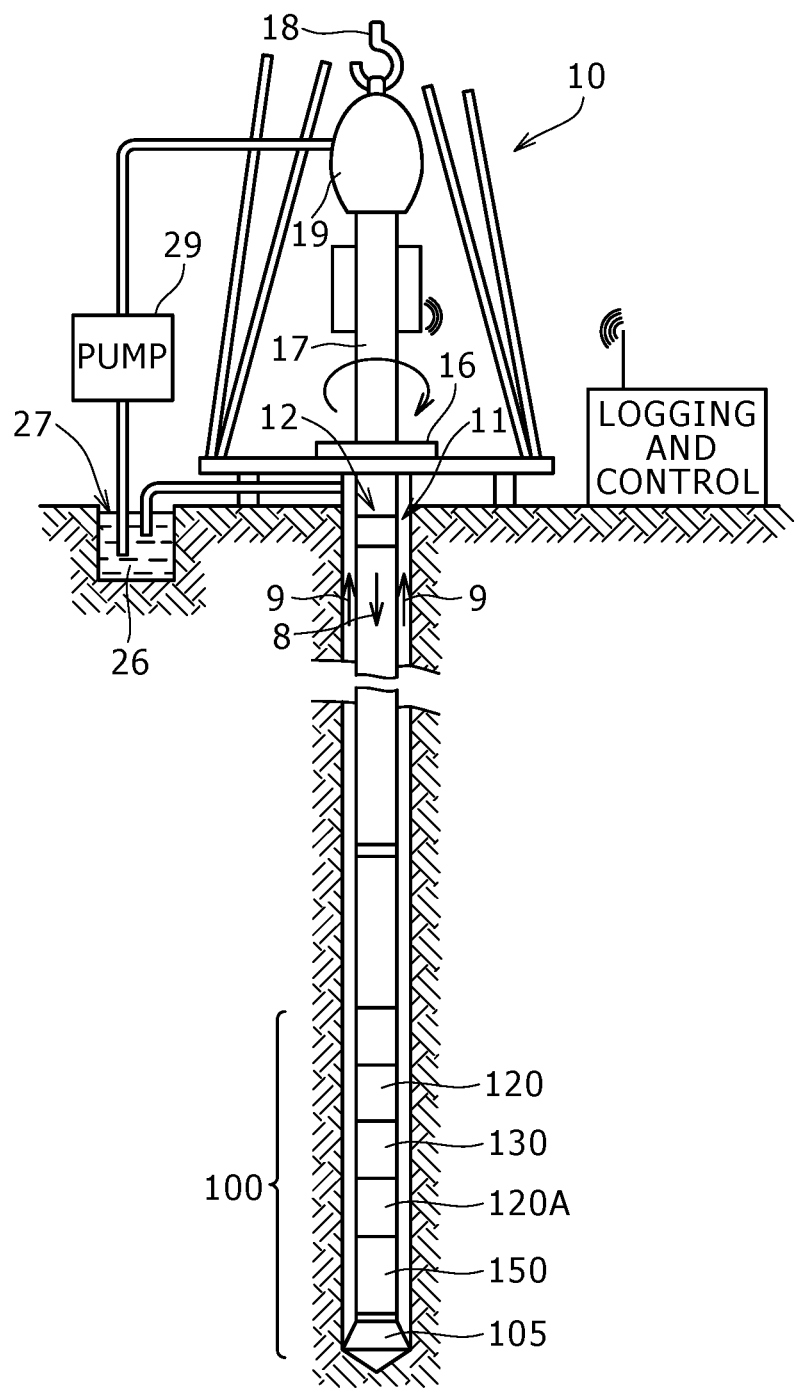
FIG. 18 illustrates a schematic illustration of a wellsite system according to embodiments of the disclosure.

FIG. 18 illustrates a wellsite system in which the present examples can be employed. The wellsite can be onshore or offshore. In this exemplary system, a borehole 11 is formed in subsurface formations by rotary drilling in a manner that is well known. The examples described herein may also use directional drilling, as will be described hereinafter.

A drill string 12 is suspended within the borehole 11 and has a bottomhole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from the hook 18, attached to a traveling block (also not shown), through the kelly 17 and the rotary swivel 19 which permits rotation of the drill string 12 relative to the hook 18. As is well known, a top drive system could alternatively be used.

In this example, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. The drilling fluid lubricates the drill bit 105 and carries formation cuttings up to the surface as it is returned to the pit 27 for recirculation.

Additionally, the wellsite system includes a communications relay 45 and a logging and control processor 50. The example communications relay 45 may receive information and/or data from sensors, transmitters and/or receivers located within the bottomhole assembly 100. The information may be received by the communications relay 45 via a wired communication path through the drillstring 12 and/or via a wireless communication path. The communications relay 45 transmits the received information and/or data to the logging and control processor 50. Additionally, the communications relay 45 may receive data and/or information from the logging control processor 50. Upon receiving the data and/or information, the communications relay 45 may forward the data and/or information to the appropriate sensor(s), transmitter(s) and/or receiver(s) within the bottomhole assembly 100.

The example logging and control processor 50 may include a user interface that enables parameters to be input and/or outputs to be displayed. Additionally, the logging and control processor 50 may control imaging of a fractures or caves (e.g., karst caves) in a subterranean formation. For example, the logging and control processor 50 may position the bottomhole assembly 100 and/or a sonic and/or seismic imaging tool within the borehole 11, instruct transmitters to transmit a signal for receivers and/or sensors to receive.

Additionally, the logging and control processor 50 may calculate a distance from the borehole 11 to a portion of a fracture and/or cave (e.g., an S-S reflection point) based on the transmitted and received signal. While the logging and control processor 50 is depicted uphole at the surface and within the wellsite system, a portion or the entire logging and control processor 50 may be positioned in the bottomhole assembly 100 and/or in a remote location. The logging and control processor 50 is described in greater detail in conjunction with FIG. 9.

The bottomhole assembly 100 of the illustrated example includes a logging-while-drilling (LWD) module 120, a measuring-while-drilling (MWD) module 130, a roto-steerable system and motor 150, and drill bit 105.

The LWD module 120 is housed in a special type of drill collar and can contain one or a plurality of logging tools. Further, more than one LWD and/or MWD module can be employed, e.g. as represented at 120A. (References, throughout, to a module at the position of 120 can alternatively mean a module at the position of 120A as well). The LWD module 120 includes capabilities for measuring, processing, and storing information, as well as for communicating with the surface equipment. In this example, the LWD module 120 includes both pressure and sonic measuring devices.

MWD module 130 is also housed in a special type of drill collar and can contain one or more devices for measuring characteristics of the drill string and drill bit. The MWD tool 130 further includes an apparatus (not shown) for generating electrical power to the downhole system. This may typically include a mud turbine generator powered by the flow of the drilling fluid, it being understood that other power and/or battery systems may be employed. In this example, the MWD module 130 includes one or more of the following types of measuring devices: a weight-on-bit measuring device, a torque measuring device, a vibration measuring device, a shock measuring device, a stick slip measuring device, a direction measuring device, and an inclination measuring device.

A particularly advantageous use of the system hereof is in conjunction with controlled steering or directional drilling. In this example, a roto-steerable subsystem 150 (FIG. 2) is provided. Directional drilling is the intentional deviation of the wellbore from the path it would naturally take. In other words, directional drilling is the steering of the drill string so that it travels in a desired direction. Directional drilling is, for example, advantageous in offshore drilling because it enables many wells to be drilled from a single platform. Directional drilling also enables horizontal drilling through a reservoir or cave.

Horizontal drilling enables a longer length of the wellbore to traverse the reservoir, which increases the production rate from the well. A directional drilling system may also be used in vertical drilling operations as well. Often, the drill bit will veer off of a planned drilling trajectory because of the unpredictable nature of the formations being penetrated or the varying forces that the drill bit experiences or the geology may not be where it is expected to be. When such a deviation occurs, a directional drilling system may be used to put the drill bit back on course.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

According to one embodiment of this disclosure, the comparatively less expensive materials can be modified to exhibit required properties of strength and corrosion resistance sufficient to either equal or exceed current requirements for service.

The preceding description has been presented only to illustrate and describe certain embodiments. It is not intended to be exhaustive or to limit the disclosures to any precise form disclosed. Many modifications and variations are possible in light of the above teaching.

The embodiments and aspects were chosen and described in order to best explain principles of the disclosures and its practical applications. The preceding description is intended to enable others skilled in the art to best utilize the principles in various embodiments and aspects and with various modifications as are suited to the particular use contemplated. It is intended that the scope of the disclosures be defined by the following claims.

What is claimed is:

1. A method for improving seismic imaging, the method comprising:
   acquiring seismic data and geomechanical data via at least one downhole logging tool;
   forward modeling to compute formation slownesses based on a first method for orthorhombic media using stress magnitudes and third-order elastic constants for an anisotropic formation under stress as inputs that are based at least in part on the data;
   forward modeling to determine formation slownesses analytically based on a second method using stress magnitudes, stress azimuth and third-order elastic constants for the anisotropic formation under stress as inputs that are based at least in part on the data, wherein the forward modeling determines eigenvalues corresponding to compressional velocity, fast shear velocity and slow shear velocity;
   based on the forward modeling to compute formation slownesses and the forward modeling to determine formation slowness, generating a velocity model for the anisotropic formation under stress; and
   estimating a location of a reservoir via seismic imaging using the velocity model.

2. The method according to claim 1, wherein the first method is based on Tsvankin method assuming a weak anisotropy.

3. The method according to claim 1, wherein the second method is based on Christoffel method.

4. The method according to claim 1, wherein the forward modeling to compute or the forward modeling to determine further uses well configuration and reference moduli as inputs.

5. The method according to claim 1, wherein results from the forward modeling to compute or the forward modeling to determine includes formation slownesses, and at least one of vertical slownesses, anisotropic parameters, anellipticity indicators and fast shear azimuth.

6. The method according to claim 1, further comprising assessing quality of one of the forward modelings based on results output from the other of the forward modelings.

7. The method according to claim 6, wherein assessing comprises at least one of:
   comparing formation slowness between results from at least one of the forward modelings and measurements;
   evaluating type of anisotropy using anellipticity parameters; and
   comparing fast shear azimuth between results from at least one of the forward modelings and measurements.

8. The method according to claim 7, wherein comparing formation slowness comprising computing at least one of normalized difference and coherence between measured and modeled slowness.

9. The method according to claim 1, further comprising combining the forward modeling and Transverse Isotropy a characterization workflow.

10. A system for improving seismic imaging, the system comprising:
    a memory and a processor used to:
    acquire seismic data and geomechanical data via at least one downhole logging tool;
    perform forward modeling to compute formation slownesses based on a first method for orthorhombic media using stress magnitudes and third-order elastic constants for an anisotropic formation under stress as inputs that are based at least in part on the data; and
    perform forward modeling to determine formation slownesses analytically based on a second method using stress magnitudes, stress azimuth and third-order elastic constants for the anisotropic formation under stress as inputs that are based at least in part on the data, wherein the forward modeling determines eigenvalues corresponding to compressional velocity, fast shear velocity and slow shear velocity;

based the forward modeling to compute formation slownesses and the forward modeling to determine formation slownesses, generate a velocity model for the anisotropic formation under stress; and estimate a location of a reservoir via seismic imaging using the velocity model.

11. The system according to claim 10, wherein the first method is based on Tsvankin method assuming a weak anisotropy.

12. The system according to claim 10, wherein the second method is based on Christoffel method.

13. The system according to claim 10, wherein the forward modeling to compute or the forward modeling to determine further uses well configuration and reference moduli as inputs.

14. The system according to claim 10, wherein results from the forward modeling to compute or the forward modeling to determine includes formation slownesses, and at least one of vertical slownesses, anisotropic parameters, anellipticity indicators and fast shear azimuth.

15. The system according to claim 10, wherein the processor is used further to assess quality of one of the forward modelings based on results output from the other of the forward modelings.

16. The system according to claim 15, wherein the assessment comprises at least one of:

a comparison of formation slowness between results from at least one of the forward modelings and measurements;

an evaluation of type of anisotropy using anellipticity parameters; and a comparison of fast shear azimuth between results from at least one of the forward modelings and measurements.

17. The system according to claim 16, wherein the comparison of formation slowness comprises computation of at least one of normalized difference and coherence between measured and modeled slowness.

18. The system according to claim 10, wherein the processor is used further to combine the forward modeling and a Transverse Isotropy characterization workflow.

\* \* \* \* \*